US011605380B1

(12) United States Patent
Houston et al.

(10) Patent No.: US 11,605,380 B1
(45) Date of Patent: Mar. 14, 2023

(54) COORDINATING CONTENT-ITEM OUTPUT ACROSS MULTIPLE ELECTRONIC DEVICES

(71) Applicant: Amazon Technologies, Inc., Seattle, WA (US)

(72) Inventors: Farah Lynn Houston, Seattle, WA (US); Marc Randall Whitten, Bellevue, WA (US); J. C. Connors, Redmond, WA (US); David Chiapperino, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 179 days.

(21) Appl. No.: 16/983,668

(22) Filed: Aug. 3, 2020

(51) Int. Cl.
*G10L 15/22* (2006.01)
*H04L 67/306* (2022.01)
*G10L 15/30* (2013.01)
*H05B 47/12* (2020.01)
*G10L 15/24* (2013.01)
*G06V 20/00* (2022.01)
*H04L 67/52* (2022.01)

(52) U.S. Cl.
CPC ............ *G10L 15/22* (2013.01); *G06V 20/00* (2022.01); *G10L 15/24* (2013.01); *G10L 15/30* (2013.01); *H04L 67/306* (2013.01); *H04L 67/52* (2022.05); *H05B 47/12* (2020.01); *G10L 2015/223* (2013.01)

(58) Field of Classification Search
CPC ......... G10L 15/22; G10L 15/24; G10L 15/30; G10L 2015/223; G06V 20/00; H04L 67/306; H04L 67/52; H05B 47/12
See application file for complete search history.

(56) References Cited

U.S. PATENT DOCUMENTS

| 2010/0315549 | A1* | 12/2010 | Basso | H04N 21/4402 |
| | | | | 348/E7.003 |
| 2019/0074991 | A1* | 3/2019 | Peterson | H04L 12/2812 |
| 2020/0380716 | A1* | 12/2020 | Baumbach | H04N 21/44218 |
| 2021/0234927 | A1* | 7/2021 | Sohn | G16Y 40/30 |

* cited by examiner

*Primary Examiner* — Abul K Azad
(74) *Attorney, Agent, or Firm* — Lee & Hayes, P.C.

(57) ABSTRACT

This disclosure describes, in part, techniques and systems for generating and outputting immersive, multi-device content items in user environment, such as connected homes, offices, and the like. For example, the techniques and systems may output different portions of content on different devices within a user environment based on information such as respective capabilities of the devices, a current location of the user within the environment, a time of day, which user(s) are present in the environment, and/or the like.

20 Claims, 10 Drawing Sheets

COORDINATING CONTENT-ITEM OUTPUT ACROSS MULTIPLE ELECTRONIC DEVICES

BACKGROUND

Client computing devices continue to proliferate. For example, homes and businesses routinely include an array of devices, including voice-controlled devices, smart televisions and other display devices, communication devices, smart-home devices, and the like. As use of client computing devices continues to proliferate, so too does the use of applications on these devices. For example, users increasingly use computing applications for communication, shopping, games, productivity, and the like.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
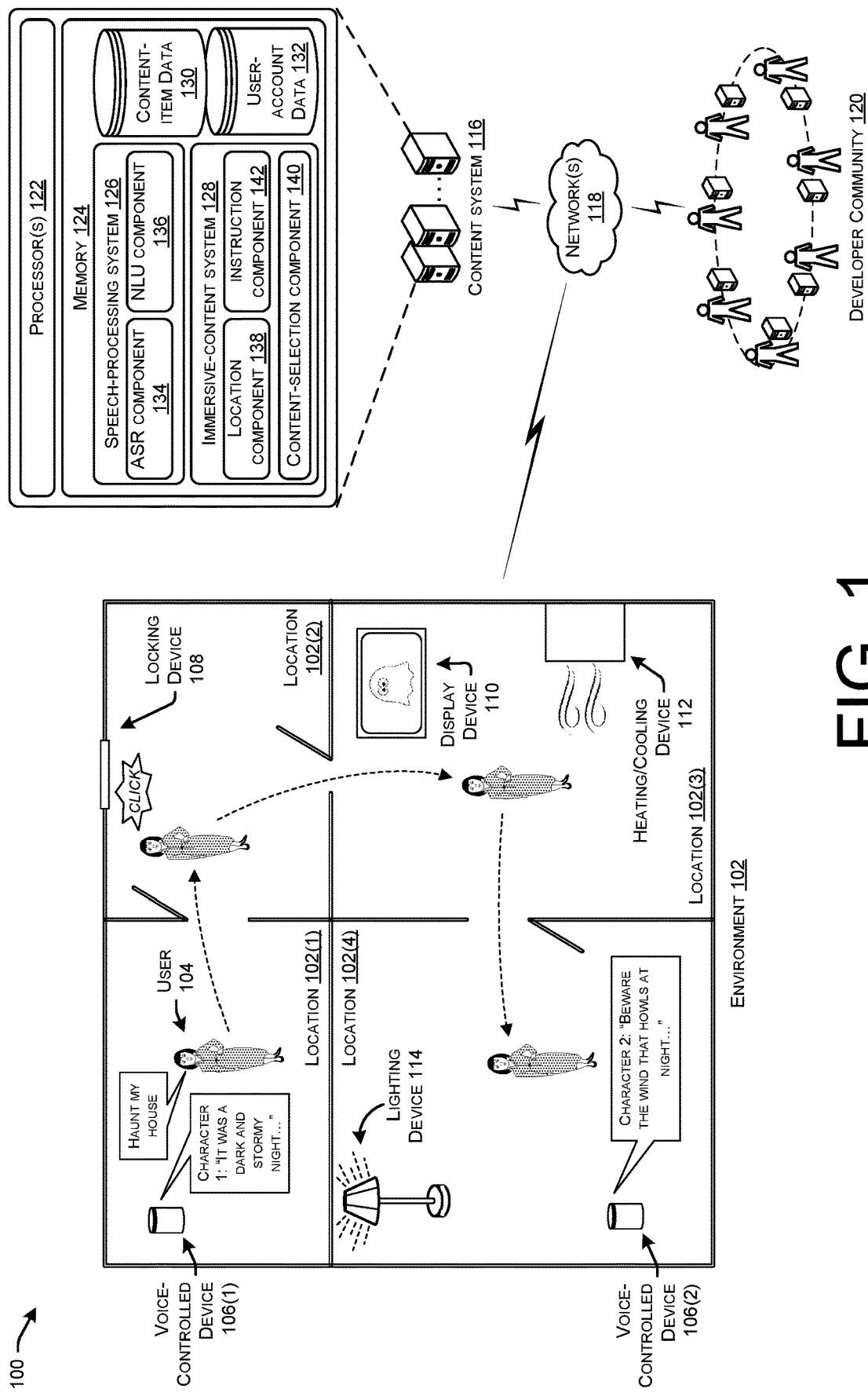
FIG. 1 illustrates a schematic diagram of an illustrative environment in which a content system receives, from a user in an example home environment, a request for content. In response, the content system sends different portions of the requested content for output on different respective devices in the environment. For instance, the user may request that the content system "haunt my house" and, in response, the content system may output different types of content on different devices and may cause certain devices to perform certain actions as the user moves through the environment.

This disclosure describes, in part, techniques and systems for generating and outputting immersive, multi-device content items in user environment, such as connected homes, offices, and the like. For example, the techniques and systems may output different portions of content on different devices within a user environment based on information such as respective capabilities of the devices, a current location of the user within the environment, a time of day, which user(s) are present in the environment, and/or the like.

In one example, the techniques and systems may cause different devices to output different portions of a common content item, such as a story. For example, a first device in a first room of an environment may output a first portion of the story, such as a first chapter of the story, the portions of the story told by a first character in the story, or the like. A second device in a second room, meanwhile, may output a second portion of the story, such as a second chapter of the story, a portion of the story told by a second character of the story, or the like. In some instances, the techniques and systems may determine a current location of a user and may output the respective portions of the story as the user moves about the environment. For example, if the user requests to output the story while residing in a first room, the techniques and systems may instruct a first device in the first room to output the first portion of the story. Thereafter, the techniques and systems may receive data indicative of the user moving from the first room to the second room and, in response, may instruct a second device in the second room to output the second portion of the story.

In some instances, the techniques and systems may determine the location of the user based on audio data generated by device(s) in the environment, image data generated by device(s) in the environment, and/or the like. For example, if a device in a particular room generates audio data that indicates speech or other sound associated with the user, then the techniques and systems may use this information to determine that the user is residing in the particular room. In another example, the techniques and systems may utilize imaging data to determine the room in which the user currently resides. Further, in other instances the techniques and systems may use GPS data generated by a wearable computing device of the user and/or any other data for determining the location of the user in the environment. Furthermore, it is to be appreciated that the techniques and systems may only determine the location of the user at the express request of the user in some instances.

To provide an example of the above, a user residing in a first room in a home of the user may request a first device in the room to "take me to Oz". The user may make this request audibly via voice-controlled device, using a graphical user interface (GUI) of a device, and/or in any other way. In some instances, a content system may receive this request and, in response, may determine a first portion of content to output in the first room. For example, the content system may determine to output audio and/or visual content associated with a particular character from the novel "The Wonderful Wizard of Oz". For example, the content system may send first output audio data to the first device for output by the first device. In some instances, the first output audio data may comprise dialogue, a song, or the like spoken by a first character from the novel. To provide an example, the first output audio data may comprise a song sung by Dorothy, such as "Somewhere Over the Rainbow".

Thereafter, the user may move from a first room in the home to a second room. One or more devices in the home may generate data indicative of this movement. These local device(s) may determine this movement or may send this data to the content system for analysis by the content system. For example, the content system may receive the data and determine that the user has moved from the first room to the second room. As described above, this data may comprise input audio data representing sound caused by the user, image data representing the user, GPS data associated with the device of the user, and/or the like.

Upon determining that the user has moved from the first room to the second room, the content system (or the local device(s)) may determine a second portion of the content item to output in the second room. For example, the content system may send, to a second device in the second room, output audio data, visual data, and/or the like for output by the second device. For example, the content system may send second output audio data representing dialogue, a song, or other content spoken by a second character in "The Wonderful Wizard of Oz". For example, this may comprise the Tin Man saying "oil can" or the Scarecrow singing "If I Only had a Brain". As the user moves into a third room, yet another portion of the content item may be output by yet another device. For example, as the user moves into the third room, a television or other display device in the third room may receive and output a portion of the movie of the "Wonderful Wizard of Oz" associated with yet another character, such as the scene in which the Wizard tells Dorothy and her colleagues to "Pay no attention to the man behind the curtain". Thus, the techniques and systems may utilize the different connected devices in the home of the example user to create an immersive experience as the user moves throughout the house.

While the above example describes outputting these different portions of the content as the user moves through the home, it is to be appreciated that the previously output content may cease outputting as the user moves out of a particular room. For example, as the user moves from the first room to the second room, the content system may send an instruction to cause the first device to cease outputting the first output audio data in addition to instructing the second device (in the second room) to begin outputting the second audio data. Further, it is also to be appreciated that the techniques and systems may take into account capabilities of the devices in selecting the portions of content to output in the environment. For example, the content system may determine whether a device in the second room is capable of outputting audio only or whether it is capable of outputting audio and video. If the former, then the content system may instruct the second device to output a portion of an electronic book of the "The Wonderful Wizard of Oz", such as the song sung by the Scarecrow. If the latter, however, then the content system may instruct the second device to output a portion of the movie of the Scarecrow singing this same time.

In still other examples, the techniques and systems may instruct smart-home devices to perform actions, in addition to instructing other devices to output audio, visual, and/or audio-visual content. For example, the content system may send instructions to smart locks, smart lights, smart blinds, smart appliances, and/or any other types of connected devices to perform respective actions based on the initial command of the user. In the example from above, for instance, the content system may send an instruction a smart light to change colors (e.g., from red to green to blue and so forth) as another device in the room outputs Dorothy singing "Somewhere Over the Rainbow".

To provide another example, a user may issue (audibly or otherwise) a request such as "Haunt my house". In response to identifying this request, the techniques and systems described herein may output different content throughout the home of the user, in addition to instructing smart devices within the home to perform certain actions. For example, in response to identifying this command, the content system may output first audio data on the first device in the first room, such as scary sounds, a Halloween-themed electronic book or the like. Further, the content system may instruct other devices in the home (in the first room or otherwise) to perform certain actions. For example, the content system may send a command to a connected air-conditioning unit in another room to begin significantly cooling this room, representing the presence of a ghost in the room. Further, as the user moves from the first room to the second room, the content system may output second content, such as second output audio content, visual content on a display device (such as scary movie), or the like. In addition, or in the alternative, the content system may cause a locking device to lock or unlock a door or to iterate quickly between these operations. The content system may further send instructions to connected blinds to open or close, while sending instructions to a connected lightbulb to pulsate between on and off or between different colors and causing a connected doorbell to ring periodically or repeatedly. Further, the content system may cause devices in other rooms to perform similar actions as the user moves throughout the environment, potentially in addition outputting different portions of audible and/or visual content.

In some instances, this experience may represent an interactive experience where a user may attempt to perform some goal, such as "catch" the ghost. For example, the content system may send instructions in a sequential order to devices within certain rooms, thus indicating the current location of the ghost. For example, the content system may instruct the air-conditioning unit in the first room to turn on to indicate the presence of the ghost in the first room, before instructing a light to pulsate in a second room to indicate that the ghost has moved from the first room to the second room, before instructing a door lock to unlock or a doorbell to ring from a third room to indicate the presence of the ghost in the third room. In some instances, the user may be deemed to have "caught" the ghost if he or she enters the same room as the "current location" of the ghost, if he or she uses a wearable computing device or mobile phone to "capture" the ghost (e.g., via a camera of the respective device), or the like. For example, if a user aims his or her camera of the mobile phone at the current location of the ghost, a display of the mobile phone may display the ghost, resulting in the capture of the ghost.

In some instances, the content presented in the different locations may further depend on historical actions by the user or other users, the constituency or users in a particular room, and so forth. For example, continuing the example of the user attempting to "catch" the ghost, certain actions that occur in a particular room may vary based on which rooms the user has previously visited. For example, if the user enters a "Room B" after having already entered "Room A" to obtain a virtual game item from Room A, then the user may successfully "capture" the ghost upon entering Room B (e.g., using the virtual game item obtained in Room A). If, however, the user enters Room B without having previously entered Room A to obtain the virtual game item, then the user might not "capture" the ghost according to the game. Thus, the location(s) within the environment previously visited by the user and, potentially, the actions taken by the user (e.g., stating a predefined utterance, opening a window, turning on a light, etc.) may affect the output of content in subsequent rooms visited by the user. In addition, or in the alternative, the identity or number of users in a room may affect the content output in that room. For example, if a ghost requires at least two users to be "captured" by the users, then the ghost may only be captured in the event that two or more users are determined to be in the room at a given time. In another example, the number of users or the identity of the users in a room may change the content spoken by a particular character in a story. For example, the character may speak more or less depending on who is currently in the room that is associated with this character.

In still other instances, a user may need to perform certain actions in order to trigger the output of certain content. For instance, a user may need to answer a riddle, perform a gesture, or otherwise perform some action in order for certain content to be output in a particular room. In one instance, a user may audibly state an answer to a riddle, and this corresponding audio data may be used to determine whether the user answered correctly. In another example, an imaging device (e.g., utilizing LIDAR, sonar, radar, RGB camera, etc.) may capture image data associated with the user, which may be used to determine whether the trigger has occurred, such as the user laying or sitting down, performing a predefined gesture, or the like.

In still another example, the techniques and systems described herein may "announce" identifiers of users as they enter an environment, such as a user home. For instance, an imaging device residing outside of the user home may generate image data indicative of a user arriving at the home. The imaging device may send this image data to the content system, which may use computer-vision (CV) techniques to determine an identifier of the user represented in the image data, such as a name, nickname, or the like associated with the user. The content system may then send this identifier for output by another device within the user home. For example, the content system may send the identifier for output by a voice-controlled device, a smart television, or the like. For example, if the content system determines that the user identifier is "Brooklyn Smith", then upon this user entering the user home a voice-controlled device or other type of device may announce that "Brooklyn Smith is here", present corresponding text or an image on the display device, or the like. Thus, the techniques and systems may enable introduction of each guest in a lighthearted manner during a house party, for example. Furthermore, the techniques and systems may use this identification for other purposes, such as playing music that an entering user has expressed an interest in, asking questions to the group regarding the entering user, and/or the like.

In some instances, the output of different portions of a content item may be synchronized in a predefined manner. For example, a first portion of a story may be output using a first device in a first room at a first time, while a second portion of the story may begin play on a second device in a second room as soon as the first portion of the story concludes. In another example, a light may turn or a door may lock at a predefined time associated with the first portion of the story being played by the first device, such as a particular timestamp of the story (e.g., 1:30 into the story, etc.). In still other instances, the same audio, video or other content may be synchronized on different devices at a same time. For example, lights in the kitchen may pulsate on and off in a synchronized manner with lights pulsating in the living room. In each of these instances, information regarding latencies of the underlying devices may be taken into account when issuing the instructions. For example, if a light is to be turned on one minute into a story and the lighting device typically has a one second latency, then an instruction may be sent to the lighting device to turn on fifty-nine seconds into the story.

In some instances, lighting devices within the environment may be coordinated to perform certain actions based on time, based on synchronization with the output of a content item, and so forth. For instance, in one example a user may request to execute a particular skill where each connected light within a home is turned on before individual ones of the light are turned off over a period of time until a single light is on. In this example, a voice-controlled device may receive the initial command and each light to turn on. In addition, after a predetermined amount of time, the voice-controlled device may instruct a first light to turn off, and so forth, until a single light remains on. Of course, the opposite may also be true, where a single light is initially turned on and, over time, additional lights are turned on over time. In still other instances, the voice-controlled device, or another device, may control the connected lights in other sequences over time.

In still other instances, connected lighting devices may be synchronized with the output of other content items. For example, while a device outputs an audio book, the device or another device may control the lights to match the mood or current ambience of the book. For example, if the audio book describes a sunset, the device may instruct the lights in the room in which the listener resides to slowly dim. If the audio book describes a dark and stormy night, the lights may turn off and, at times, flashed on to simulate lightning. In these examples, the audio book (and other content) may be associated with instructions that are associated with particular locations in the book. Thus, when the device outputting the audio book reaches a particular location in the book having an instruction to send an instruction to a lighting device in the environment, the device may do so. Further, while the above example describes synchronizing lighting experiences with audio books, it is to be appreciated that these lighting experiences may additionally or alternatively be synchronized with the output of music, videos, and/or the like.

Furthermore, it is to be appreciated that the techniques described herein may enable different levels of immersive content with a user environment. For instance, in one example, the immersive-content experience may enable an ambient environment, such as devices in the user environment acting collectively to output the sights and sounds that would be found in the land of Oz. In another immersive-content experience, the story of Dorothy in the land of Oz may be played over time within this immersive environment of the land of Oz. in still other examples, the techniques may enable the type of immersive-content ambience while involving active participation of the user, such as the user engaging in a quest to save Dorothy from the clutches of the Wicked Witch of the West, or the like. Regardless of the level of the immersive-content experience, devices in the user environment may work collectively to transform the user environment to a desired theme, story, experience, or the like.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram of an illustrative architecture 100 that includes a user environment 102 in which a user 104 issues a request for content within the environment 100. For instance, in this example, the user 104 issues a voice command to "Haunt my house" to a voice-controlled device 106(1) that resides within a first location 102(1) of the environment 100. In response, the voice-controlled device 106(1) may begin outputting first content in association with the request. In this example, the device 106(1) begins outputting a first chapter of a scary story within the location in which the user 104 and the device 106(1) reside.

Thereafter, in this example the user 104 moves from the first location 102(1) of the environment 102 to a second location 102(2) of the environment 102. As illustrated, this location 102(2) may include a locking device 108, such as a smart lock that locks and unlocks a door to the environment 102. This locking device 108, as well as each device described herein, may be configured to communicate with one or more devices over one or more networks, such as short-range wireless network(s) (e.g., Bluetooth, Zigbee, etc.), long-range wireless network(s) (e.g., WiFi), wired network(s), and/or the like.

In response to the user moving from the first location 102(1) to the second location 102(2), the locking device 108 may lock and/or unlock the door, such as repeatedly locking and unlocking to add suspense to the environment 102 in accordance with the request of the user 104 to "haunt my house". In some instances, the movement of the user may be identified based on data generated at the environment, such as image data of an imaging device illustrating the user moving between locations in the environment, audio data generated by the voice-controlled device 106(1), GPS data associated with a mobile phone or wearable device of the user 04, and/or the like. Using this data to determine movement and current location of the user 104 is described in more detail below.

Further, in response to the user 104 moves from the second location 102(2) to a third location 102(3), a display device 110 within the third location 102(3) may present second content. In this example, the second content comprises an image of a ghost in accordance with the request of the user. In addition, a heating/cooling device 112 may receive an instruction to either cool or heat the room in response to the request of the user. In some instances, the display device 110 may present the second content on the display in response to the user entering the third location 102(3), while the heating/cooling device 112 may begin cooling the room (for instance) upon the user 104 issuing the initial request such that the location 102(3) has sufficient time to cool.

As FIG. 1 further illustrates, the user 104 may move from the third location 102(3) in the environment to a fourth location 102(4) of the environment 102, which may include a second voice-controlled device 106(2) and a lighting device 114. In response to the user 104 moving from the third location 102(3) to the fourth location 102(4), the voice-controlled device 106(2) may begin outputting third content in accordance with the request of the user 104. For instance, the device 106(2) may begin outputting a second chapter of the scary story described above with reference to the device 106(1). In addition, the lighting device may receive an instruction to turn off the light, turn on the light, pulsate between off and on, change colors of the light, and/or the like.

As will be appreciated, the techniques of FIG. 1 thus enable a user to issue a single request, such as "Haunt my house" and, in response, different devices within the environment 102 may output different but related portions of content or may perform different but related actions. In this example, each portion of content and each action is associated with the command to 'haunt the house' of the user 104. Further, while a few example portions of content and a few example actions have been described, it is to be appreciated that multiple other different types of content may be output, and multiple other devices may be instructed to perform different actions. This may include, for example, instructing smart blinds to open or close, causing a garage door to open or close, turning on or off smart appliances, and/or the like.

In order to output this content and cause the smart devices to perform the described actions, FIG. 1 illustrates that the architecture 100 may include a content system 116 that couples to the devices within the environment 102 via one or more wired and/or wireless networks 118. In addition, the content system 116 and/or the devices in the environment 102 may couple respective devices of a developer community 120. In general, the content system 116 and/or developers of the developer community 120 may define user experiences, such as the experience to enable the user 104 to 'haunt the house' of the user. That is, a respective command (e.g., "haunt my house") may be associated with multiple actions that collectively define a user experience. These actions may include outputting different portions of a content items using multiple devices, such as having a first device output a first chapter of a story and a second device output a second chapter of a story, having a first device output a song associated with a story and a second device output dialogue of the story, and so forth. In addition, these actions may include causing smart devices to perform certain actions. In the example of 'haunting my house', the user experience may include causing the device 106(1) to output the first chapter of the scary story and the device 106(2) to output the second chapter, causing the locking device 108 to lock/unlock the door, causing the display device 110 to present the image of the ghost, causing the heating/cooling device 112 to cool the location 102(3), and causing the lighting device 114 to turn on/off the light. In some instances, the actions performed within a particular user environment may depend on devices within the particular user environment and capabilities of these devices. For example, the command "haunt my house" may also be associated with opening and closing smart blinds in a user environment, but given that the environment 102 of the user 104 does not include smart blinds, the experience of the user 104 might not include this action.

As illustrated, the content system 116 may be hosted by one or more network-accessible resources, such as server computing devices. While illustrated as being collocated, it is to be appreciated that these resources may be located across different regions and/or across the globe. Further, the network(s) 118 which connect the content system 116 to the developer and client devices may represent an array or wired networks, wireless networks (e.g., WiFi), or combinations thereof. Further, the content system 116 may generally refer to a network-accessible system—or "cloud-based system"—implemented as a computing infrastructure of processors, storage, software, data access, and so forth that is maintained and accessible via the network(s) 118, such as the Internet. Cloud-based systems may not require end-user knowledge of the physical location and configuration of the system that delivers the services. The client computing devices described herein, meanwhile, may comprise tablet computing devices, smart televisions (TVs), laptop computer, desktop computers, mobile phones, voice-controlled devices, display devices, audio devices, gaming devices, smart-home devices, internet-of-things (IoT) devices, and/or the like, any or all of which may be used to output portions of content items as described below. The application developers of the developer community 120 may similarly utilize any type of suitable computing device, including mobile phones, desktop computers, laptop computers, server computers, and/or the like.

As illustrated, the content system 116 may include one or more processors 122 and memory 124. The processors 122 may include a central processing unit (CPU) for processing data and computer-readable instructions, and the memory 124 may store computer-readable instructions that are executable on the processor(s) 122. The memory 124 may individually include volatile random access memory (RAM), non-volatile read only memory (ROM), non-volatile magnetoresistive (MRAM) and/or other types of memory.

Figure 7:
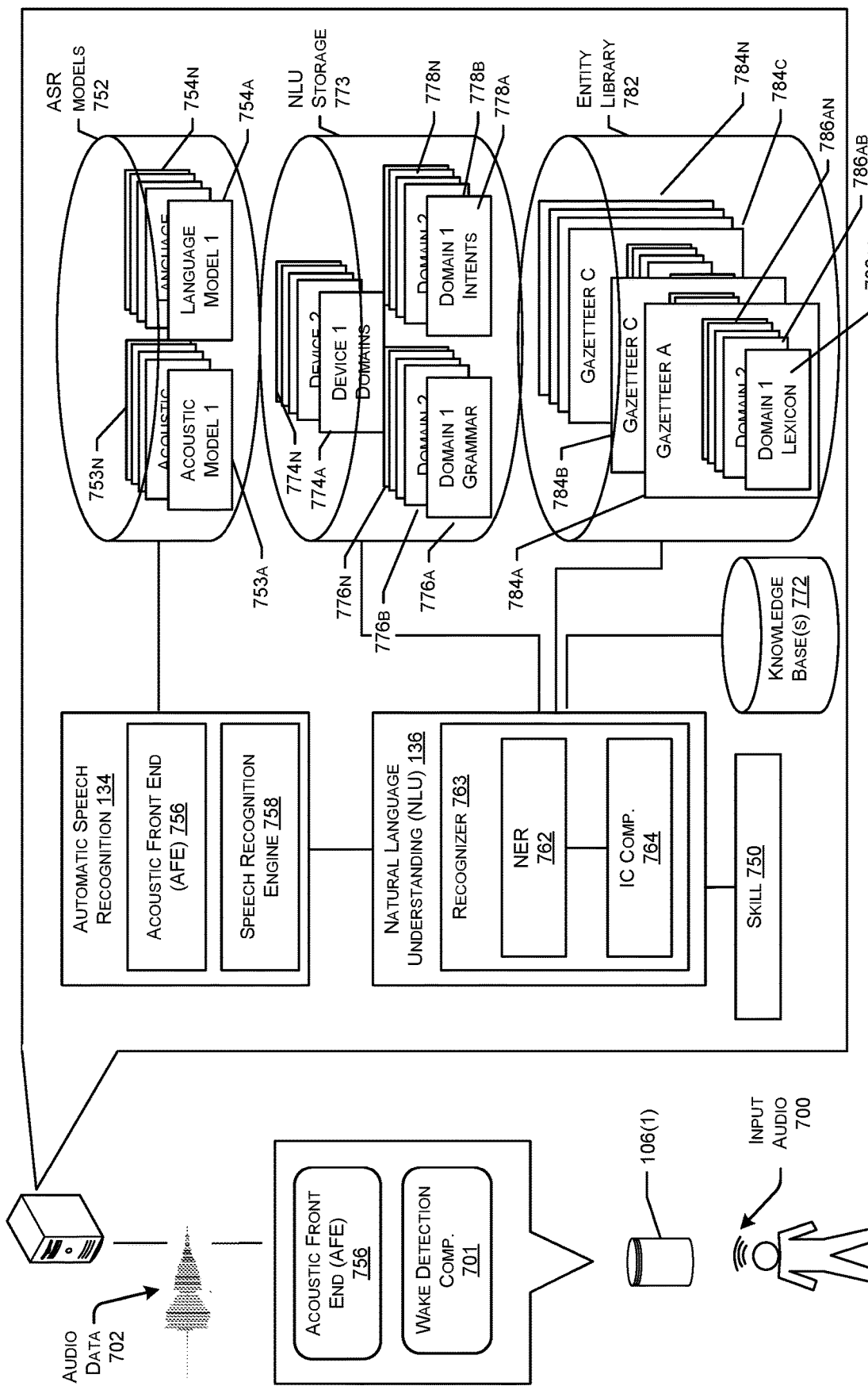
FIG. 7 illustrates a conceptual diagram of components of a speech-processing system that the content system of FIG. 1 may utilize for processing audio data provided by one or more devices.
Figure 8:
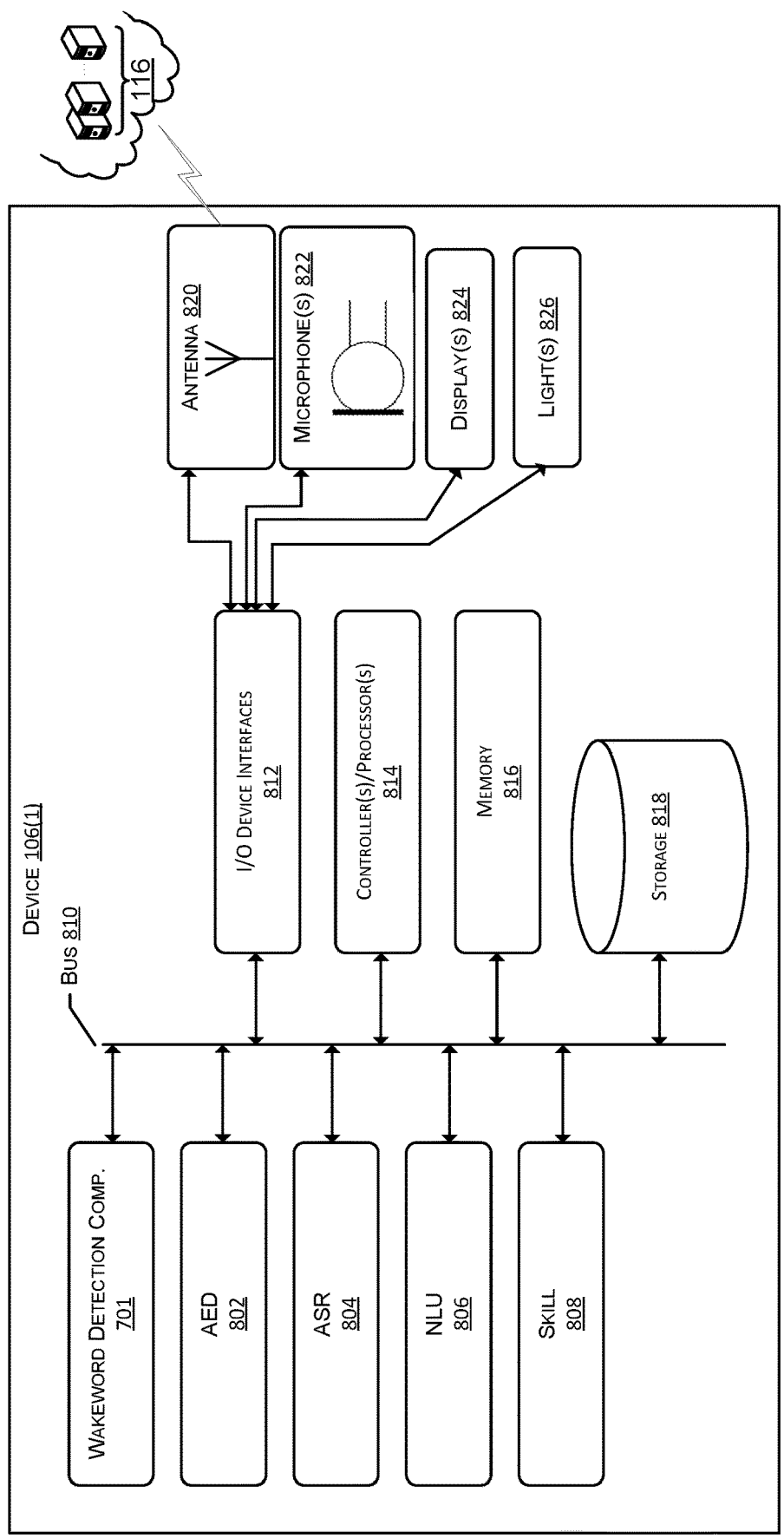
FIG. 8 illustrates a conceptual diagram of example components of an electronic device that may be utilized in association with the techniques described herein.

As illustrated, the memory 124 of the content system 116 may store a speech-processing system 126, an immersive-content system 128, content-item data 130, and user-account data 132. The speech-processing system 126 may function to receive audio data generated by one or more client devices and identify voice commands represent therein. For example, the speech-processing system 126 may include an automated-speech-recognition (ASR) component 134 and a natural-language-understanding (NLU) component 136. The ASR component may be configured to receive audio data and generate text data corresponding to user speech within the audio data. For example, the ASR component may receive audio data generated by the voice-controlled device 106(1) and generate text data corresponding to the command of the user 104 "Haunt may house". The NLU component 136, meanwhile, may receive the text data, and potentially additional data, to generate intent data indicating an intent associated with the user command. In this example, the NLU component 136 determines that the user 104 intended to launch a user experience stored in association with a content item that collectively functions to "haunt" the environment 102 of the user 104. FIGS. 7 and 8 describe the speech-processing operations in greater detail below.

The immersive-content system 128, meanwhile, may function launch an immersive-content experience at the request of the user, such as in response to the NLU component 136 determining the intent of the user 104 to haunt the house of the user 104. For example, the content-item data 130 may include multiple different "content items" that each define a series of actions to be performed in response to a respective user request. For example, one content item may be named "Haunt my house" and may be associated with the actions and content described above. That is, the content item "Haunt my house" may be associated with the scary story described above along with instructions to output a first chapter on a first device, a second chapter on a second device, and so forth. This content item may additionally be associated with causing a locking device to lock/unlock a door, a lighting device to pulsate a light on and off, and so forth. Thus, a content item may comprise a collection of actions and content to be performed and/or output by devices in an environment, such as the environment 102. Further, the output or execution of each content item may differ based on the types of devices present in each environment and the capabilities of these devices, as discussed above.

The immersive-content system 128 may include a location component 138, a content-selection component 140, and an instruction component 142. The location component 138 may be configured to determine a location of a user, which may be associated with outputting of certain content of the performance of certain actions. For example, the location component 142 may receive data from one or more devices in a user environment and may use this data to a determine a location associated with the user. For example, the location component 142 may receive audio data from a device and may analyze this audio data to determine whether the user is in the same room as the device. For example, the location component 142 may use time-difference-of-arrival (TDOA) techniques and/or other techniques to determine, using the audio data, the location of the user within an environment. In another example, the location component 142 may receive image data from an imaging device in an environment, which may be used to determine the location of the user, such as the user 104. As described below, this location may be used to determine content to output, actions to take by one or more devices, and/or the like.

The content-selection component 140 may select which content to output on which devices at a particular time based on one or more factors. First, the content-selection component 140 may select a content item to output based on the command of the user. For example, the content-selection component 140 may select the content item corresponding to the "Haunt my house" in response to the command of the user 104. Thereafter, the content-selection component 140 may determine which piece of content to output at any given time based on a current location of the user 104, a previous location of the user 104, devices present in the environment 104, capabilities of the devices, and so forth. In this regard, the user-account data 132 may store information associated with respective user accounts, such as an indication of devices in a user environment, these devices capabilities, the location of these devices in the user environment, and/or the like. For example, the user-account data 132 may indicate that the environment 102 of the user 104 includes the voice-controlled device 106(1) in the first location 102(1) (e.g., the first room), the locking device 108 in the second location 102(2) (e.g., the second room), the display device 110 and the heating/cooling device 112 in the third location 102(3) (e.g., the third room), the voice-controlled device 106(2) and the lighting device 114 in the fourth location 102(4) (e.g., the fourth room), and so forth.

In this example, the content-selection component 140 determines that the device that generated the audio data corresponding to the initial user command is capable of outputting audio data and, thus, the content-selection component 140 determines to output a first chapter of the scary story on the voice-controlled device 106(1). The instruction component 142 thus generates and sends an instruction to output this content to the device 106(1).

The location component 138 then determines that the user 104 has moved from the first location 102(1) of the environment to the second location 102(2) of the environment 102. In response, the content-selection component 140 may determine that the second location of the environment includes the locking device 108 and that the "Haunt my house" content item specifies that a locking device is to lock/unlock a door if such a device capability is present. Thus, the instruction component 142 generates and sends an instruction to cause the locking device 108 to rapidly lock and unlock the door. Next, the location component 138 determines that the user 104 has moved to the third location 102(2) and, in response, the content-selection component 140 determines that the third location 102(3) includes the display device 110 and, in response, may select visual content for output by the display device 110 as specified by the content item. The instruction component 142 may then generate and send instruction data to cause the display device to present the selected content. Further, in some instances the content-selection component 140 may have initially determined, upon receiving the indication of the command of the user, that the content item specifies to cool at least one room of the environment 102. In addition, the content-selection component 140 may have determined, at the time of the command, that the environment 102 included the heating/cooling device 112 and, therefore, the instruction component 142 may have generated and sent an instruction to the device 112 to execute a desired temperature setting (e.g., to cool the room).

Figure 2:
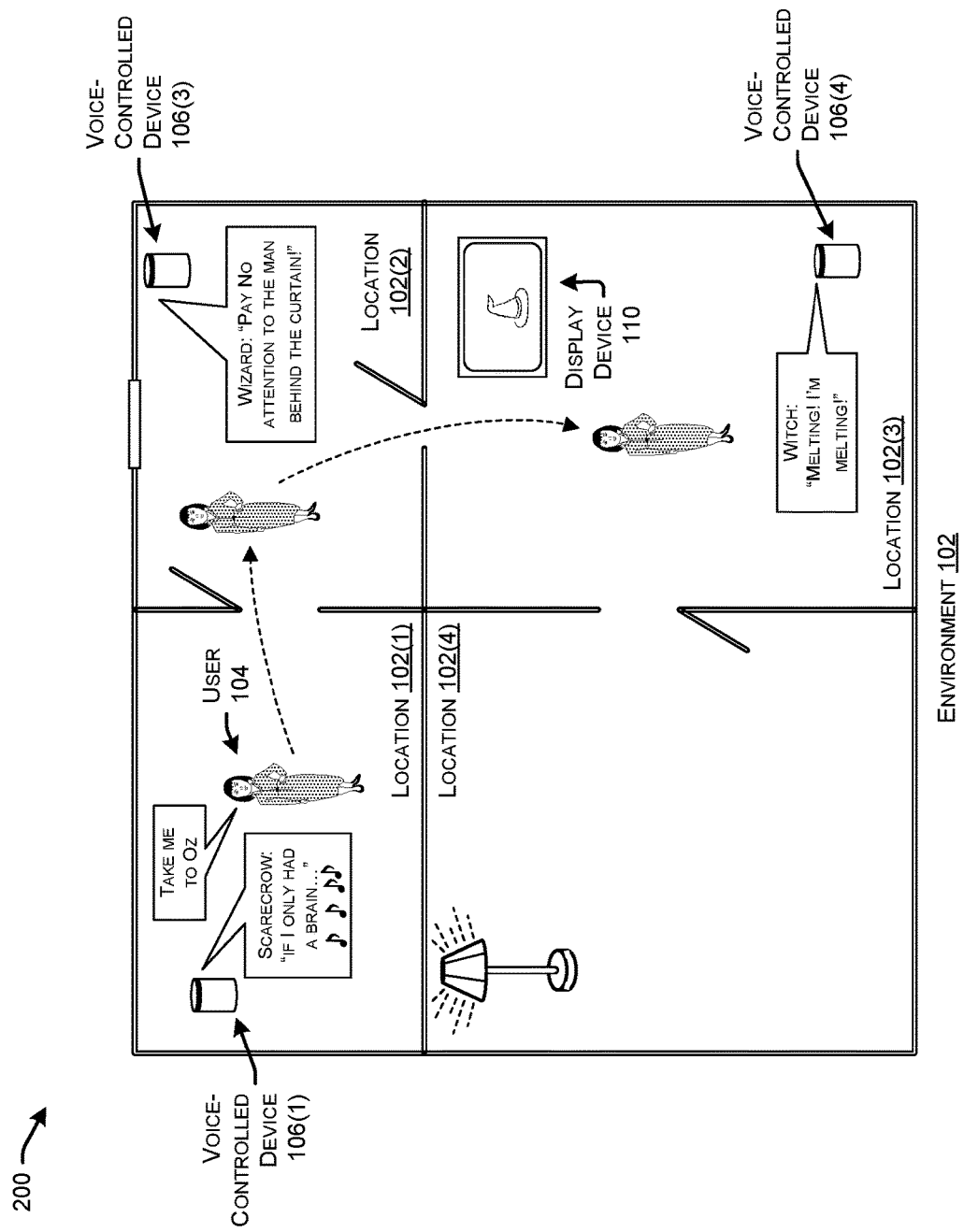
FIG. 2 illustrates an example scenario where the user of FIG. 1 requests content and, in response, the content system outputs different portions of the content in different rooms of the environment. For example, the content system causes a first device to output content associated with a first character, a second device to output content associated with a second character, and so forth. In some instances, the respective devices output the respective content as the user moves into the respective rooms in which the devices reside.
Figure 3:
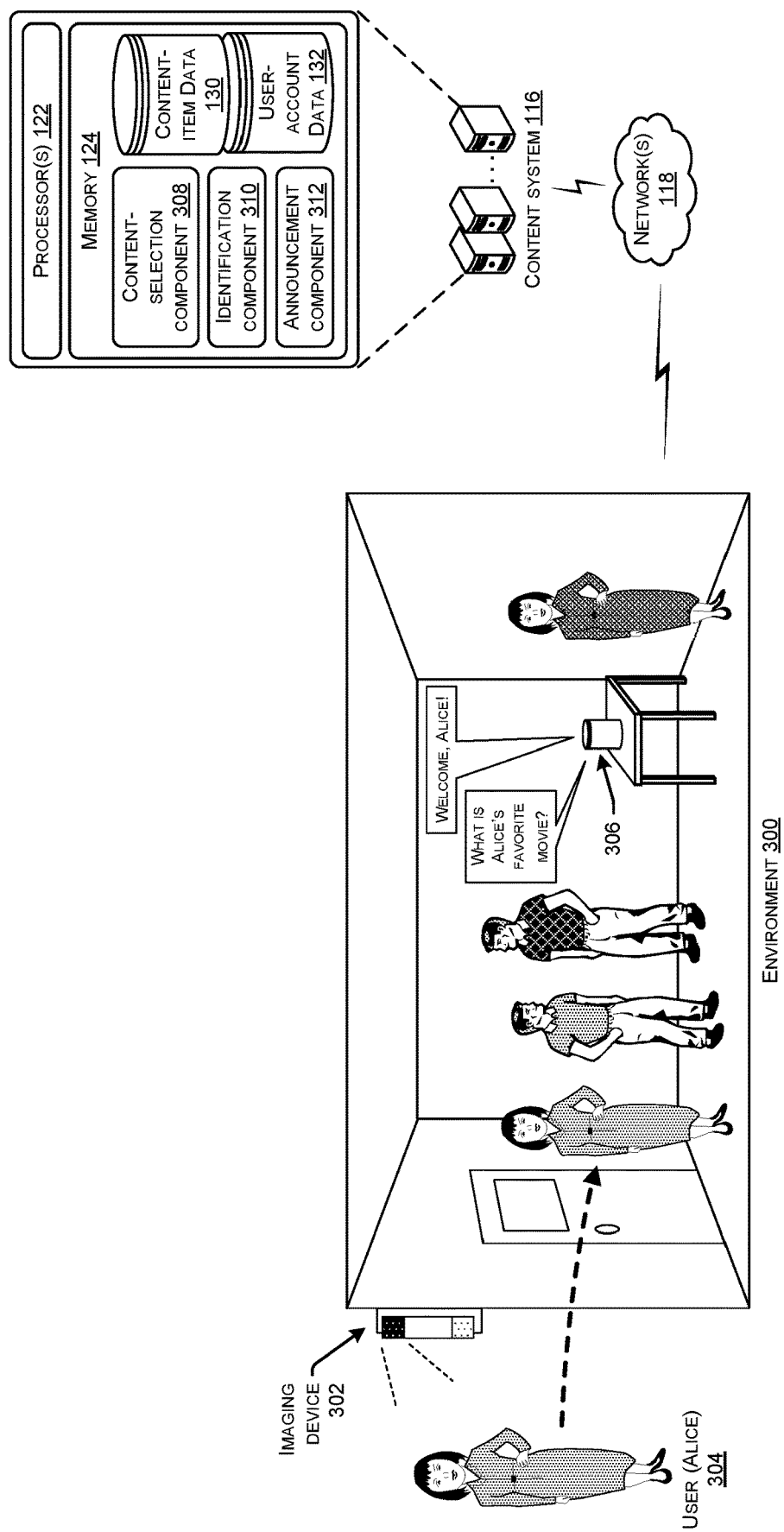
FIG. 3 illustrates another example scenario where an imaging device outside of an environment generates and sends imaging data of a user to the content system, which determines an identifier (e.g., a name) associated with the user and sends this identifier to a computing device in the environment. The computing device may then "announce" the presence of the user by outputting the identifier and, in some instances, may output content that is customized to this user.

Next, in this example the location component 138 may determine that the user 104 has moved to the fourth location. In response, the content-selection component 140 may determine that the fourth location of the environment includes the device 106(1). Thus, the component 140 may determine to output a second chapter of the story using the device 106(1) and the instruction component 142 may generate and send this instruction. Further, the content-selection component 140 may determine that the fourth location 102(4) includes the lighting device 114, and that the "Haunt my house" content item specifies that a lighting device is to pulsate a light on and off if such a device capability is present. Thus, the instruction component 142 generates and sends an instruction to pulsate the light in this manner. Of course, while one example content item ("Haunt my house") is described, the content-item data 130 may store any other content items, which may specify the output of any other type of content and the occurrence of any other actions. FIGS. 2 and 3 describe additional immersive-content experiences, but it is to be appreciated that these are merely illustrative and that other experiences are contemplated. For example, while not illustrated, in some instances the immersive-content experiences may be augmented with content generated augmented-reality (AR) devices (e.g., glasses), virtual-reality (VR) devices, and/or the like.

FIG. 2 illustrates another example scenario 200 that the techniques and architecture described above with reference to FIG. 1 may enable. In this example, the user 104 issues a request to "Take me to Oz". In response, the content system 116 of FIG. 1 may identify the request (e.g., via ASR and NLU) and determine the corresponding content item based on this request. This content item ("Take me to Oz") may specify that different devices within different rooms of the user environment 102 are to output different portions of content that are related to "The Wonderful Wizard of Oz". In some instances, these different portions of content may be output in response to the user 104 moving through the environment, while in other instances they may be output without regard to the current location of the user.

In the illustrated example, upon the user issuing the request to "Take me to Oz"., the content system 116 may cause the voice-controlled device 106(1) that captured the request of the user 104 to output content from "The Wonderful Wizard of Oz" that is spoken by or otherwise associated with a first character. For example, FIG. 2 illustrates that the voice-controlled device 106(1) may begin outputting the song "If I Only Had a Brain", as sung by the Scarecrow within the movie "The Wonderful Wizard of Oz". Upon the content system 116 determining that the user 104 has moved from the first location 102(1) in the environment 102 to the second location 102(2) in the environment 102, meanwhile, the content system 116 may send an instruction to the device 106(1) to cause this device to cease outputting the first content and may send an instruction to a voice-controlled device 106(3) in the second location 102(2) of the environment to output content spoken by or associated with a second character in the story. In this example, for instance, the device 106(3) outputs speech spoken by the Wizard in the "The Wonderful Wizard of Oz".

Further, in response to the content system 116 determining that the user 104 has moved from the second location 102(2) in the environment 102 to the third location 102(3) in the environment 102, the content system 116 may send an instruction to the device 106(3) to cause this device to cease outputting the second content and may send an instruction to a voice-controlled device 106(4) in the third location 102(3) of the environment to output content spoken by or associated with a third character in the story. In this example, for instance, the device 106(4) outputs speech spoken by the Wicked Witch of the West ("I'm melting . . . "). In addition, the content system 116 may determine that the third location 102(3) includes the display device 110 and, thus, the content system 116 may send an instruction to the display device 110 to output related content. This may comprise an image of the witch, a portion of the movie corresponding to the audible content currently being played, or the like.

In still other instance, the different locations of the environments may be associate with different geographical locations, each of which may be associated with a common content item or theme. For instance, in the example where the user states "Take me to Oz", the first location 102(1) may be associated with a first geographical location of Oz, the second location 102(2) with a second geographical location, and so forth. For example, in response to the user stating "Take me to Oz", the content system 116 may cause a device in the first location to output content associated with Kansas, a device in the second location to output content associated with the Munchkin land, and a device in the third location in the environment to output content associated with the Emerald city. This content may comprise songs or sounds that appear in the movie when these geographical locations occur in the movie, imagery (e.g., images, videos, etc.) presented in the movie at these geographical locations, and/or the like. In addition, certain smart-home devices in these locations may be instructed to perform certain actions based on these geographical locations. For example, a fan or cooling unit in the first location may be instructed to turn on HIGH to replicate the blowing winds of Kansas, while a lighting device in the third location may be instructed to turn green to replicate the color associated with the city of Oz.

In addition, while the above examples described "transforming" a user environment into different portions of new environment (e.g., different locations associated with "The Wizard of Oz"), in some instances the immersive-content experiences described herein may be associated with a predefined amount of time. For example, some of the experiences may enable a user to transform their environment into the new environment for a certain length of time, such as one hour, during which the user may either enjoy the environment, solve a mystery, and/or the like. In still other instances, the user environment may remain in the immersive-content state until a user requests otherwise.

FIG. 3 illustrates yet another example scenario 300 that the techniques described above with reference to FIG. 1 may enable. In this example, a user environment 300 includes an imaging device 302, such as a "doorbell camera", a security camera, or the like. The imaging device 302 may generate image data of a user 304 that approaches the user environment 300 and may send this image data to the content system 116 over the network(s). Further, while this example illustrates an imaging device on an exterior of the environment, in other instances an interior imaging device may enable the same or similar techniques. In either instance, the image data may be provided to the content system 116, which may further store another content-selection component 308, an identification component 310, and an announcement component 312, along with the content-item data 130 and the user-account data 132.

The identification component 310 may use computer-vision (CV) techniques to analyze the image data to identify a user account associated with the user 304. For example, the identification component 310 may generate feature data from the image data and insert this feature data into one or more trained classifiers for determine a user identifier associated with the image data. In this example, the identification component 310 may determine that the image data represents a user associated with an identifier of "Alice".

After the identification component 310 determines that the imaging device has captured image data of "Alice", the announcement component 312 may send an instruction to a device 306 within the environment 300 to announce that Alice has arrived. For example, FIG. 3 illustrates that the upon Alice entering the user environment 300, the device 306 may output audio data welcoming Alice to the environment 300 ("Welcome, Alice!").

The content-selection component 308, meanwhile, may select content to output in the environment 300 based at least in part on determining the identifier of the user 304 that entered the room. For example, the content-selection component 308 may determine, from the user-account data 132, Alice's favorite music or the like and, in response, may instruct the device 306 or another device to output this music or other content. In another example, and as illustrated, the content-selection component 308 may determine a fact associated with the account of the identified user and generate query data for output by the device 306. In this example, the device 306 outputs the question "What is Alice's favorite movie?" to the other guests in the room. While not illustrated, the other guests may state their answer(s), and audio data representing these answer(s) may be sent to the content system 116 for determining whether they represent a correct answer or not (as determined with reference to the user-account data 132). Further, while FIG. 3 illustrates the query data being audibly by the device 306, it is to be appreciated that in other instances this query, as well as the announcement, may be output visually.

While the above example describes the imaging device 302 sending image and/or feature data to the content system 116 for determining the identifier of the user 304, in other instances the imaging device 302 may perform this recognition locally. For example, the imaging device 302 may be configured with machine-learning models for analyzing captured image data or feature data generated therefrom to determine an identifier of the user 304. This determination may be used to "announce" the user 304 or for determining content associated with the user to output in the environment, such as the example trivia question associated with the user 304. Further, in these instances the imaging device 302 may send the image data, or feature data generated therefrom, to the content system 116 for verifying the user identifier determined by the imaging device 302. In addition, or in the alternative, to requesting verification of the determination, the imaging device 302 or another device associated with the environment may send an indication of the user identifier to enable the content-selection component 308 to select content for outputting in the environment, such as the example question regarding Alice's favorite movie.

In some instances, the content-selection module 308 may select content based on the constituency of the users in the environment 300. For example, the content-selection module 308 may be configured to analyze respective user accounts associated with the four illustrated users to determine songs that are associated with a music library of each of the four users. The content-selection component 308 may then cause the device 306 or other device(s) in the environment 300 to output this music. Of course, while this example describes outputting commonly enjoyed music, these techniques may apply to other types of content, such as outputting common images, videos, applications, skills, or the like.

In some instances, the content-selection component 308 may send certain content to individual user devices associated with the users in the environment 300, in addition or in the alternative to sending content to the device 300. For example, upon determining the user identifiers and corresponding user accounts of the four illustrated users in the environment 300, the content-selection component 308 may determine information (e.g., phone numbers, etc.) for contacting mobile phones or other mobile devices associated with each of the four users. The content-selection component 308 may then send the same or different content to these mobile devices. For example, the content-selection component 308 may send a poll to each mobile device associated with the four illustrated users. In another example, the content-selection component 308 may send virtual scavenger hunt requests to the mobile devices, inviting the users in the environment 300 to capture images of certain other users, certain items in the environment, or the like. In some instances, upon users within the environment 300 capturing images or videos using their respective mobile devices, the content-selection component may cause one or more output devices (e.g., a smart television) in the environment 300 to output these images, videos, or the like. Thus, and as will be appreciated, the content-selection component 308 may select different content to output based on the constituency of users in the environment 300 and may send the different content to devices associated with the users determined to currently reside in the environment. Further, while the above example describes the content-selection component 308 determining the identity of these mobile devices based on the association between the mobile devices and respective user accounts (e.g., as stored in the user-account datastore 132), in other instances, local WiFi beacons or the like in the environment 300 may additionally or alternatively be used to determine the presence of mobile devices of the users.

Furthermore, while FIG. 3 illustrates determining an identifier of the user 304 using image data, in some instances additional or alternative data may be used to make this determination. For example, in some instances Bluetooth or other short-range wireless communication protocols may be used to identify a mobile device of the user 304. An identifier associated with this mobile device may be provided to the content system 116, which may determine (from the user-account datastore 132) that the identified mobile device is associated with the user 304. In another example, a local device may store a predefined "guest list" of users expected to be in the environment 300 at a particular day and/or time, and may determine, from the identified mobile device, that the user 304 has arrived. In still other instances, users may scan a barcode or other visual identifier at the imaging device 302 or other imaging device in the environment, with this information being used to determine that a particular user has arrived at the environment. Of course, while a few examples are described, it is to be appreciated that other techniques may be utilized for determining when a user has arrived at the environment 300.

Figure 4A:
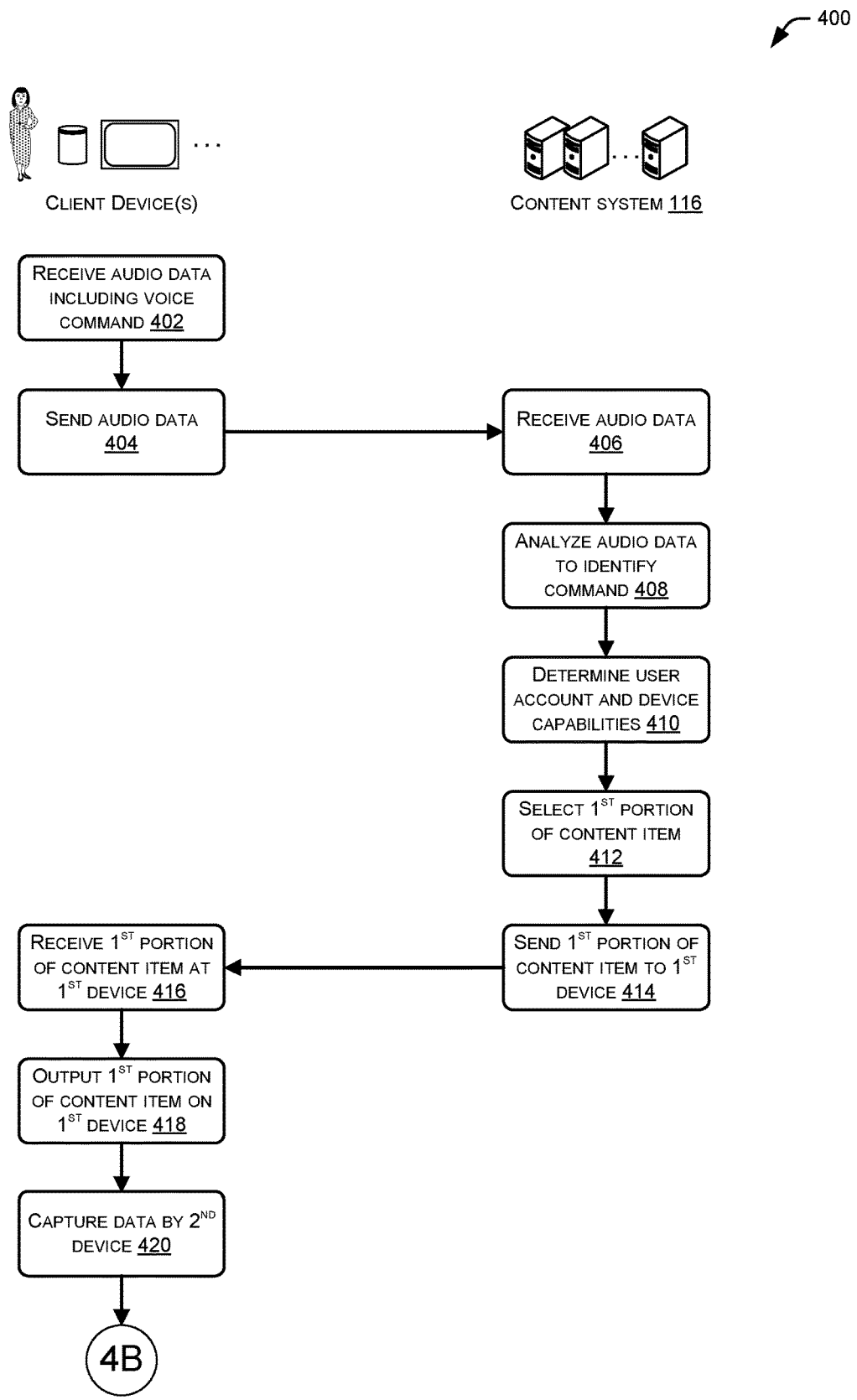
FIGS. 4A-B collectively illustrate an example sequence of operations that may occur in the environment of FIG. 1 for outputting respective portions of a content item on respective devices in an environment as the user moves through the environment.
Figure 4B:
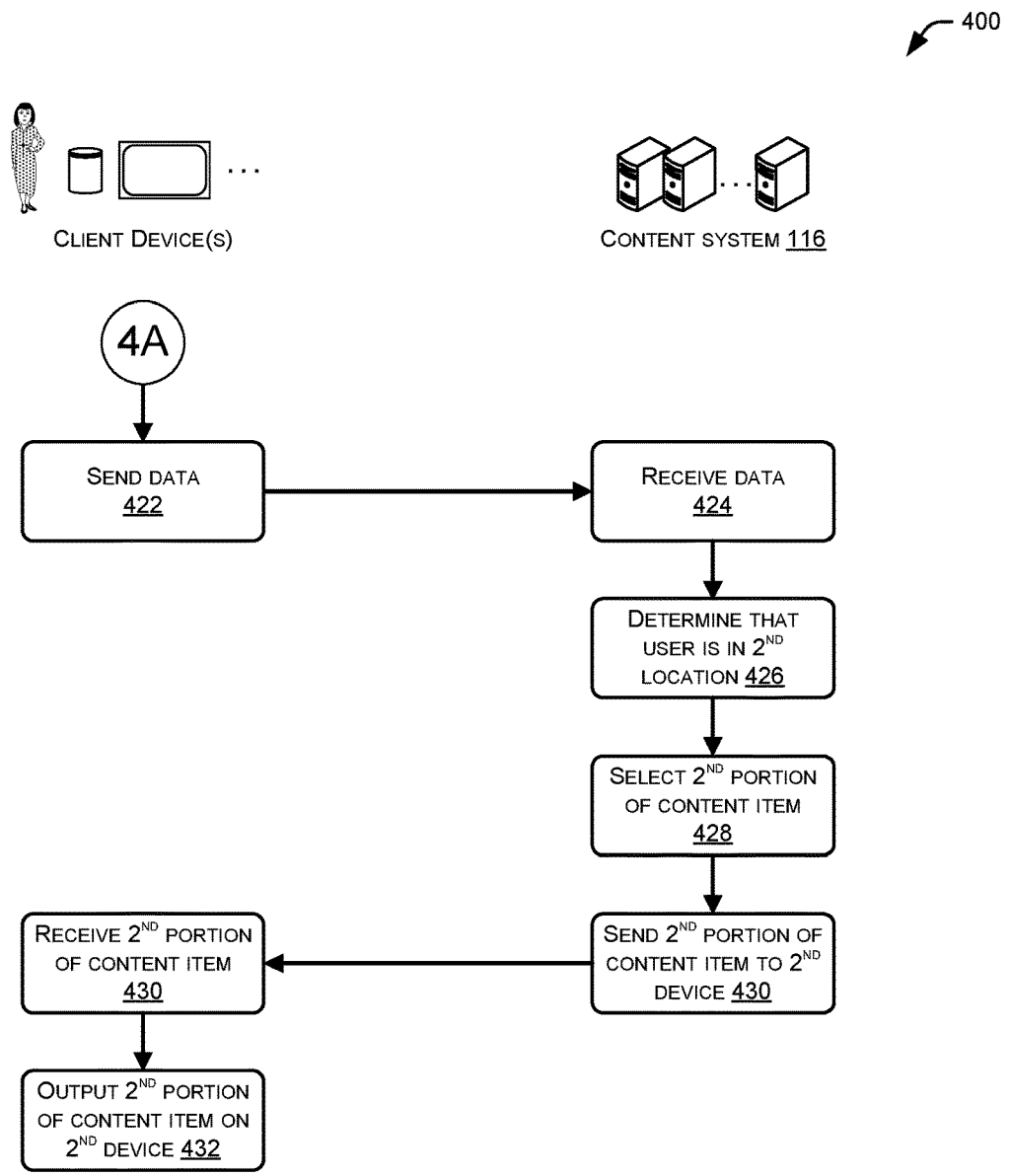

FIGS. 4A-B collectively illustrate an example sequence of operations 400 that may occur in the environment of FIG. 1 for outputting respective portions of a content item on respective devices in an environment as the user moves through the environment. At an operation 402, a first electronic device located in a first room of an environment generates input audio data representing a voice command of a user requesting output of a content item. At an operation 404, the first electronic device sends the audio data to the content system 116, which receives the audio data at an operation 406.

At an operation 408, the content system 116 analyzes the input audio data to identify the voice command requesting output of the content item. For example, the content system 116 may perform ASR and NLU on the input audio data to identify the voice command. At an operation 410, the content system 116 determines a user account associated with the voice command and, via the user account, determines device capabilities of devices associated with the user account. For example, the audio data received from the first electronic device may be accompanied by an identifier of the first electronic device, which the content system 116 may use to identify the user account. The user account may store an indication of the devices that have been associated with this account, along with the capabilities of these devices.

At an operation 412, the content system 116 selects a first portion of the content item for output by the first electronic device. In some instances, this first portion of content may be selected based on a capability of the first electronic device. For example, if the user requests to "haunt my house" using a voice-controlled device that does not include a display, the selecting may include selecting audio data of spooky noises or a chapter of a scary story.

At an operation 414, the content system sends instructions to output the first portion of the content item to the first electronic device, which receives the instructions to output first portion of the content item at an operation 416. At an operation 418, the first electronic device outputs the first portion of the content item. An operation 420 represents a second electronic device generate additional data, such as image data, audio data, GPS data, and/or the like.

FIG. 4B continues the illustration of the sequence of operations 400 and includes, at an operation 422, the second electronic device sending the generated data to the content system 116, which receives the data at an operation 424. At an operation 426, the content system 116 analyzes the data to determine that the user has moved from a first location in the environment to a second location in the environment. For example, this operation may include using the audio and/or image data to determine that the user has moved from a first room associated with a first electronic device to a second room associated with a second electronic device. At an operation 428, the content system 116 selects a second portion of the content item. Again, this may be selected based on a capability of the second electronic device. If the second device includes the capability of outputting audio, then the second portion may comprise a subsequent chapter of the story, for example. At an operation 430, the content system 116 sends instructions to output the second portion of the content item to a device in the environment, such as to the device associated with the second room in which the user now resides. The device within the environment may receive these instructions at an operation 430 and may output the second portion of the content item at an operation 432. Further, the techniques may continue as the user continues to move throughout the user environment and into different rooms associated with different devices having different capabilities.

Figure 5:
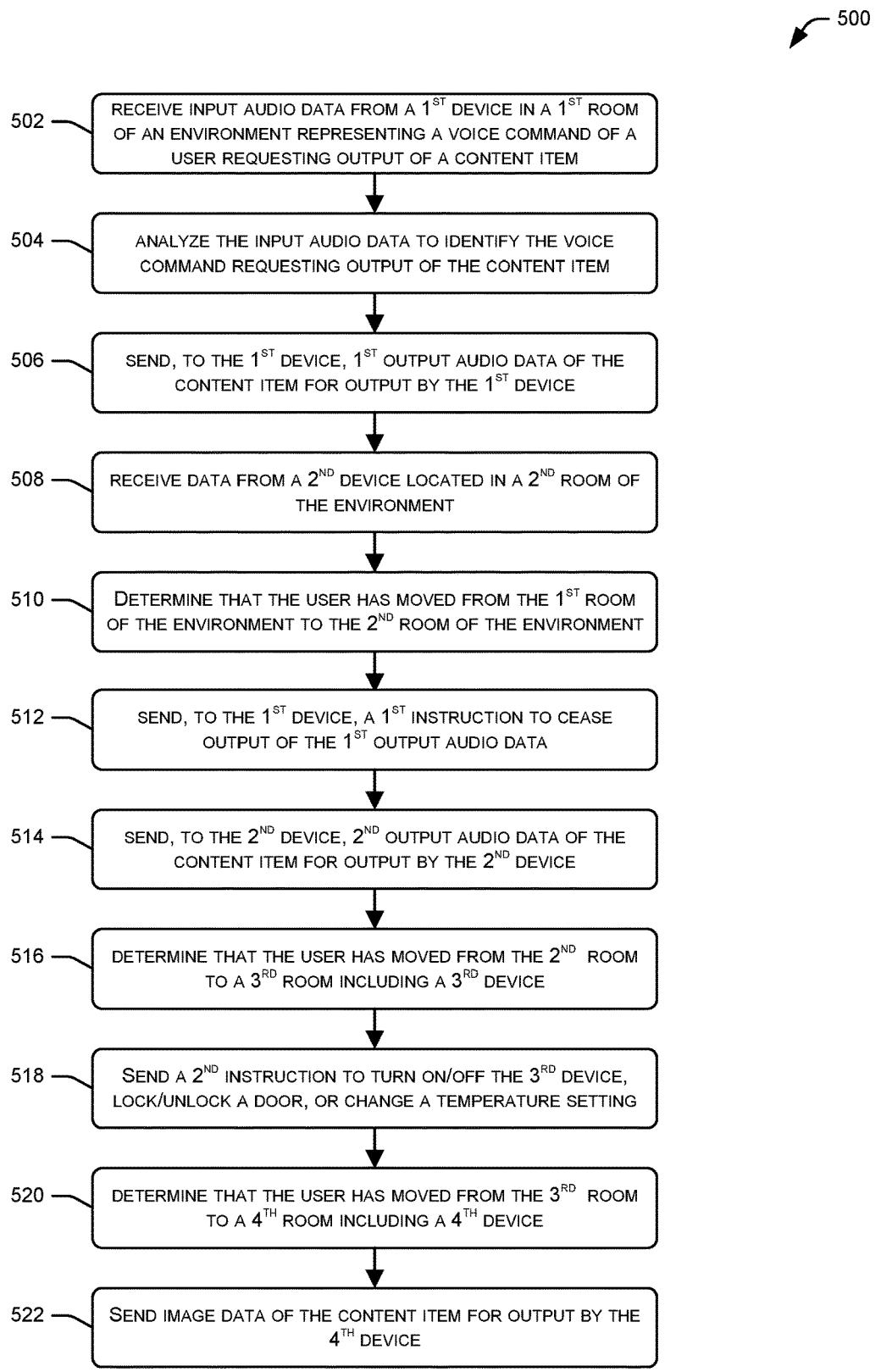
FIG. 5 illustrates a flow diagram of an example process for outputting respective portions of a content item on respective devices in an environment and causing respective devices to perform respective actions as the user moves through the environment.

FIG. 5 illustrates a flow diagram of an example process 500 for outputting respective portions of a content item on respective devices in an environment and causing respective devices to perform respective actions as the user moves through the environment. In some instances, the process 500 is performed in whole or in part by the content system 116 of FIG. 1. Further, while FIG. 1 illustrates the content system 116 as remote from the user environment 102, in some instances some or all of this system may reside within the environment 102.

At an operation 502, the content system may receive input audio data from a first electronic device located in a first room of an environment, the input audio data representing a voice command of a user requesting output of a content item. At an operation 504, the content system may analyze the input audio data to identify the voice command requesting output of the content item and, at an operation 506, may send, to the first electronic device, first output audio data of the content item for output by the first electronic device. It is to be appreciated that sending the first output data (and other types of content) may comprise sending the raw data itself, or instructions (e.g., a URL) to fetch the content, for instance.

At an operation 508, the content system 116 may receive data from a second electronic device located in a second room of the environment. This data may comprise audio data, image data, and/or the like. At an operation 510, the content system 116 may determine, based at least in part on the receiving of the data, that the user has moved from the first room of the environment to the second room of the environment. At an operation 512, and at least partly in response to the determining that the user has moved from the first room of the environment to the second room of the environment, the content system may send, to the first electronic device, an instruction to cease output of the first output audio data. In addition, at an operation 514, the content system 116 may send, to the second electronic device, second output audio data of the content item for output by the second electronic device, the second output audio data being different than the first output audio data. For example, the first output audio data may comprise first speech spoken by a first character associated with the content item, while the second output audio data may comprise second speech spoken by a second character associated with the content item.

In still other instances, the first output audio data may be associated with a first geographical location associated with the content item, while the second output audio data may be associated with a second geographical location associated with the content item. For example, envision that the user initially issues a command to "Take me to Oz". In response, a first device in the first location of the environment may output music that is played in the movie at "Munchkin Land", such as "Follow the Yellow Brick Road". A second device at the second location of the environment, meanwhile, may output music that is played in Kansas in the movie, such as "Somewhere Over the Rainbow". In still other instances, a third device at a third location in the environment may output third content that is associated with a third geographical location associated with the content item. For example, a smart television located in the third location of the user environment may output images of the Emerald City or may play the scenes of the movie that occur at the Emerald City. Thus, the user may effectively "experience Oz" by moving about different locations in her house that include the different devices outputting the different content described immediately above.

At an operation 516, the content system 116 may determine that the user has moved from the second room in the environment to a third room in the environment, the third room including a third electronic device. In response, at an operation 518, the content system may send, to the third electronic device and at least partly in response to the determining that the user has moved from the second room of the environment to the third room of the environment, a second instruction to at least one of turn on the third electronic device, turn off the third electronic device, lock a door coupled to the third electronic device, unlock the door coupled to the third electronic device, or change a temperature setting associated with the third electronic device. While a few examples are listed, it is to be appreciated that any other type of action may occur using any other type of smart-home or IoT device. In some instances, these smart-home or IoT devices may perform these actions in response to receiving instructions directly from the content system 116 over the network, in response to detecting instructions from other devices (e.g., over Bluetooth, via inaudible frequencies), and/or the like.

At an operation 520, the content system 116 may determine that the user has moved from the third room in the environment to a fourth room in the environment, the fourth room including a fourth electronic device. In response, at an operation 522, the content system may send, to the fourth electronic device and at least partly in response to the determining that the user has moved from the third room of the environment to the fourth room of the environment, image data of the content item for output on a display of the fourth electronic device. For example, while the first and second output audio data may comprise speech data, songs or the like, the image data may comprise a related image, a related video, or the like, similar to some of the experiences discussed above with reference to FIGS. 1-3.

Figure 6A:
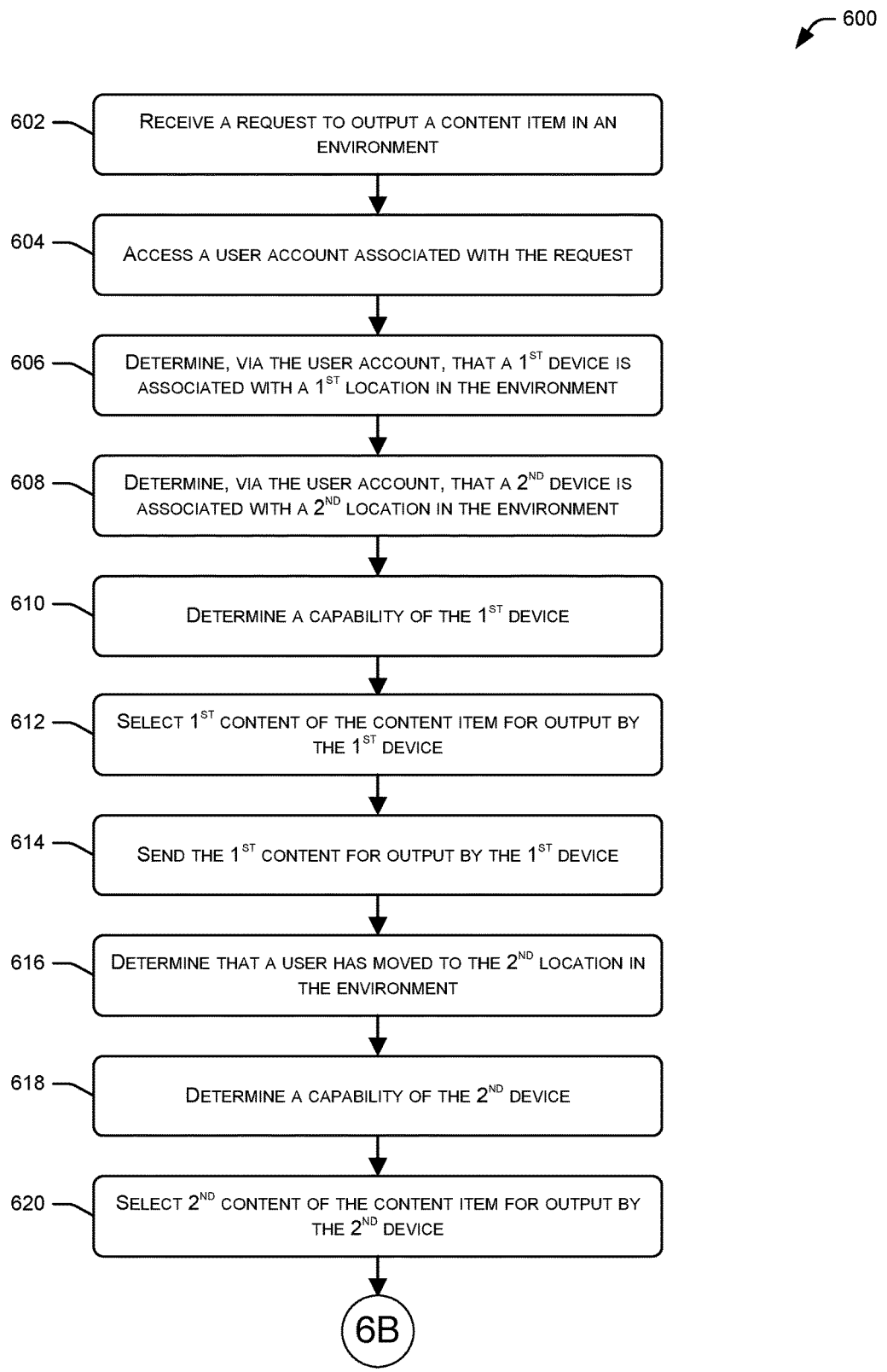
FIGS. 6A-B collectively illustrate a flow diagram of another example process for outputting respective portions of a content item on respective devices in an environment and causing respective devices to perform respective actions as the user moves through the environment.
Figure 6B:
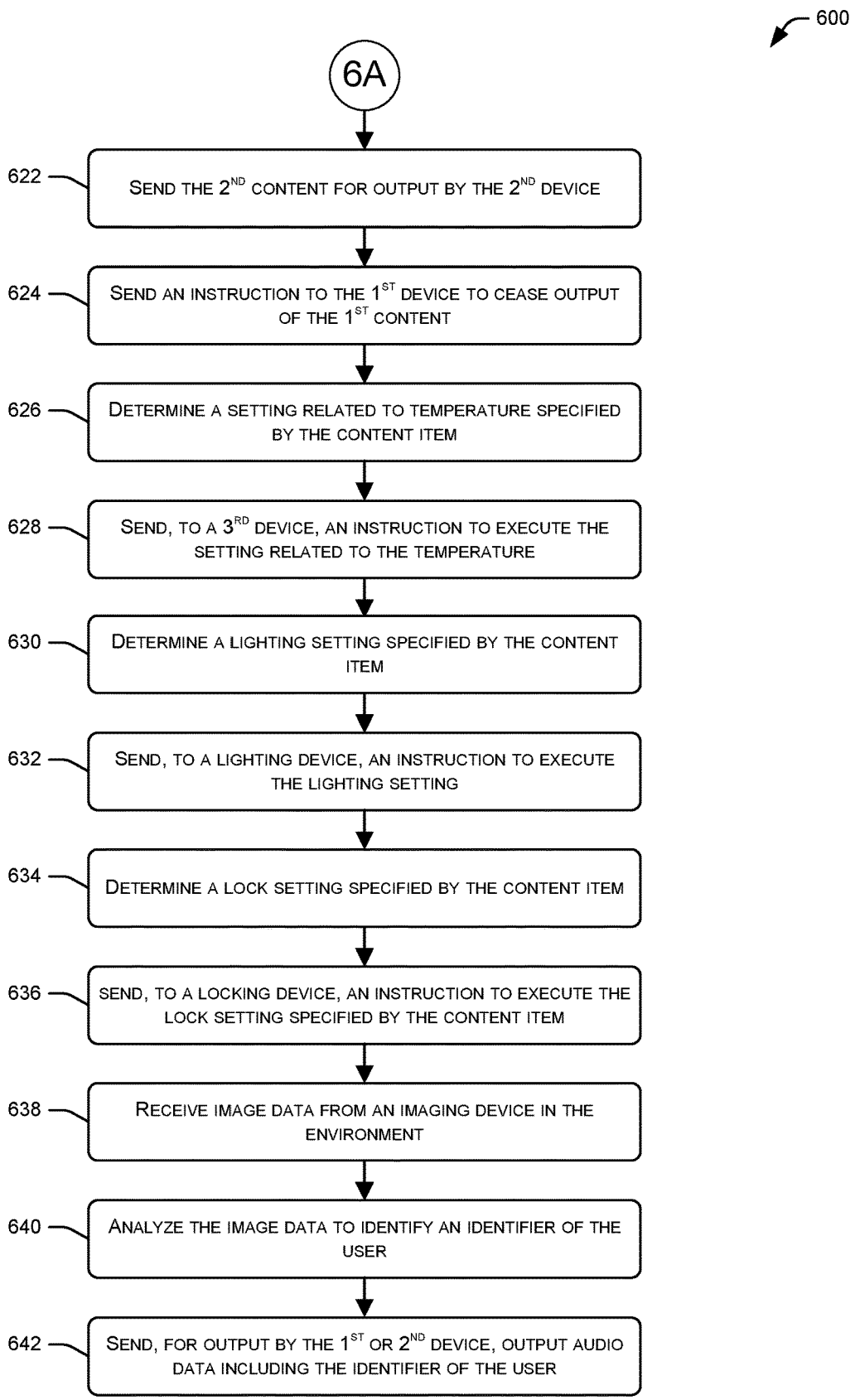

FIGS. 6A-B collectively illustrate a flow diagram of another example process 600 for outputting respective portions of a content item on respective devices in an environment and causing respective devices to perform respective actions as the user moves through the environment. Again, in some instances the process 600 may be performed by the content system 116.

At an operation 602, the content system 116 may receiving a request to output a content item in an environment. This request may be received via a voice command, a GUI command, or in any other manner. At an operation 604, the content system may access a user account associated with the request and, at an operation 606, may determine, via the user account, that a first electronic device is associated with a first location in the environment. At an operation 608, meanwhile, the content system 116 may also determine, via the user account, that a second electronic device is associated with a second location in the environment. At an operation 610, the content system 116 may determine a first capability of the first electronic device and, at an operation 612, select first content of the content item for output by the first electronic device. In some instances, the selecting of the first content of the content item may be based on the capability of the first device. For example, if the first electronic device is capable of outputting audio but does not include a display, then the first content may comprise audio data. Meanwhile, if the first electronic device is capable of outputting audio and video, then the first content may comprise a video, an image, and/or the like. An operation 614 represents the content system 116 sending the selected first content for output by the first electronic device.

An operation 616, meanwhile, represents the content system 116 determining that a user has moved to the second location in environment, while an operation 618 represents the content system 116 determining a second capability of the second electronic device. An operation 620 represents the content system 116 selecting second content of the content item for output by the second electronic device. In some instances, the selecting of the second content of the content item may be based on the capability of the second device. For example, if the second electronic device is capable of outputting audio but does not include a display, then the second content may comprise audio data. Meanwhile, if the second electronic device is capable of outputting audio and video, then the second content may comprise a video, an image, and/or the like.

FIG. 6B continues the illustration of the process 600 and includes, at an operation 622, sending the second content of the content item for output by the second electronic device, the second content differing from the first content. In addition, at an operation 624 the content system 116 may send an instruction to the first electronic device to cease output of the first content at least partly in response to the determining that the user has moved to the second location in the environment.

At an operation 626, the content system 116 may also determine setting related to temperature specified by the content item. For example, one content item may specify that at least one room is to be made cold, while another or the same content item may specify that at least one room is to be made hot. At an operation 628, the content system 116 may send, to a third electronic device, an instruction to execute the setting related to the temperature as specified by the content item. For example, the instruction may cause the third electronic device to set the temperature of the room at a specified value.

An operation 630, meanwhile, represents determining a lighting setting specified by the content item. For example, a content item may specify that a light is to be dimmed, changed colors, flashed between colors, turned off, turned on, pulsating between colors or between off and on, and/or the like. At an operation 632, the content system 116 may send, to a lighting device, an instruction to execute the lighting setting specified by the content item.

An operation 634 represents that the content system may determine a lock setting specified by the content item. For instance, a content item may specify that a locking device is to lock, unlock, oscillate between the two states, and/or the like. At an operation 636, the content system 116 may send, to a locking device, an instruction to execute the lock setting specified by the content item.

At an operation 638, meanwhile, the content system 116 may receive image data from an imaging device associated with the environment. For example, the content system 116 may receive image data from the imaging device 302 described above with reference to FIG. 3. At an operation

640, the content system 116 may analyze the image data to identify an identifier of a user that has entered the environment and, at an operation 642, may send output audio data for output on at least one of the first electronic device or the second electronic device, the output audio data indicating the identifier of the user. For example, the content system 116 may "announce" the presence of the user, as described above with reference to FIG. 3.

FIG. 7 illustrates a conceptual diagram of components of a speech-processing system for processing audio data provided by one or more devices. FIG. 7 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as content system 116). The various components illustrated may be located on a same device or different physical devices. Message between various components illustrated in FIG. 7 may occur directly or across a network 118. An audio capture component, such as a microphone of the example device 106(1), or another device, captures audio 700 corresponding to a spoken utterance. The device 106(1), using a wake word engine 701, then processes audio data corresponding to the audio 700 to determine if a keyword (such as a wakeword) is detected in the audio data. Following detection of a wakeword, the device 106(1) sends audio data 702 corresponding to the utterance to the remote system 116 that includes an ASR component 134. The audio data 702 may be output from an optional acoustic front end (AFE) 756 located on the device prior to transmission. In other instances, the audio data 702 may be in a different form for processing by a remote AFE 756, such as the AFE 756 located with the ASR component 134 of the remote system 116.

The wake word engine 701 works in conjunction with other components of the user device, for example a microphone to detect keywords in audio 700. For example, the device may convert audio 700 into audio data, and process the audio data with the wake word engine 701 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 701 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 701 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 106(1) may "wake" and begin transmitting audio data 702 corresponding to input audio 700 to the remote system 116 for speech processing. Audio data corresponding to that audio may be sent to remote system 116 for routing to a recipient device or may be sent to the remote system 116 for speech processing for interpretation of the included speech (either for purposes of enabling voice-messages and/or for purposes of executing a command in the speech). The audio data 702 may include data corresponding to the wakeword, or the portion of the audio data corresponding to the wakeword may be removed by the local device 106(1) prior to sending. Further, a local device may "wake" upon detection of speech/spoken audio above a threshold, as described herein. Upon receipt by the remote system 116, an ASR component 134 may convert the audio data 702 into text. The ASR transcribes audio data into text data representing the words of the speech contained in the audio data 702. The text data may then be used by other components for various purposes, such as executing system commands, inputting data, etc. A spoken utterance in the audio data is input to a processor configured to perform ASR which then interprets the utterance based on the similarity between the utterance and pre-established language models 754 stored in an ASR model knowledge base (ASR Models Storage 752). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 753 stored in an ASR Models Storage 752), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR component 134 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 756 and a speech recognition engine 758. The acoustic front end (AFE) 756 transforms the audio data from the microphone into data for processing by the speech recognition engine 758. The speech recognition engine 758 compares the speech recognition data with acoustic models 753, language models 754, and other data models and information for recognizing the speech conveyed in the audio data. The AFE 756 may reduce noise in the audio data and divide the digitized audio data into frames representing time intervals for which the AFE 756 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 758 may process the output from the AFE 756 with reference to information stored in speech/model storage (752). Alternatively, post front-end processed data (such as feature vectors) may be received by the device executing ASR processing from another source besides the internal AFE. For example, the user device may process audio data into feature vectors (for example using an on-device AFE 756) and transmit that information to a server across a network for ASR processing. Feature vectors may arrive at the remote system 116 encoded, in which case they may be decoded prior to processing by the processor executing the speech recognition engine 758.

The speech recognition engine 758 attempts to match received feature vectors to language phonemes and words as known in the stored acoustic models 753 and language models 754. The speech recognition engine 758 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, haunt my house" The wake detection component may identify the wake word, otherwise described as a trigger expression, "Alexa," in the user utterance and may "wake" based on identifying the wake word. Audio data corresponding to the user utterance may be sent to the remote system 116, where the speech recognition engine 758 may identify, determine, and/or generate text data corresponding to the user utterance, here "haunt my house."

The speech recognition engine 758 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 758 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 116, for natural language understanding (NLU) processing, such as conversion of the text into commands for execution, either by the user device, by the remote system 116, or by another device (such as a server running a specific application like a search engine, etc.).

The device performing NLU processing 136 may include various components, including potentially dedicated processor(s), memory, storage, etc. As shown in FIG. 7, an NLU component 136 may include a recognizer 763 that includes a named entity recognition (NER) component 762 which is used to identify portions of query text that correspond to a named entity that may be recognizable by the system. A downstream process called named entity resolution links a text portion to a specific entity known to the system. To perform named entity resolution, the system may utilize gazetteer information (784a-784n) stored in entity library storage 782. The gazetteer information may be used for entity resolution, for example matching ASR results with different entities (such as voice interface devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 134 based on the utterance input audio 700) and attempts to make a semantic interpretation of the text. That is, the NLU process determines the meaning behind the text based on the individual words and then implements that meaning. NLU processing 136 interprets a text string to derive an intent or a desired action from the user as well as the pertinent pieces of information in the text that allow a device (e.g., device 106(1)) to complete that action. For example, if a spoken utterance is processed using ASR 134 and outputs the text "play notifications" the NLU process may determine that the user intended to have notifications output by one or more devices.

The NLU 136 may process several textual inputs related to the same utterance. For example, if the ASR 134 outputs N text segments (as part of an N-best list), the NLU may process all N outputs to obtain NLU results.

As will be discussed further below, the NLU process may be configured to parse and tag to annotate text as part of NLU processing. For example, for the text "play notifications," "play" may be tagged as a command (to output images and/or audio) and "notifications" may be tagged as the category of the content to be output.

To correctly perform NLU processing of speech input, an NLU process 142 may be configured to determine a "domain" of the utterance so as to determine and narrow down which services offered by the endpoint device (e.g., remote system 116 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 762 receives a query in the form of ASR results and attempts to identify relevant grammars and lexical information that may be used to construe meaning. To do so, the NLU component 136 may begin by identifying potential domains that may relate to the received query. The NLU storage 773 includes a database of devices (774a-774n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 763, language model and/or grammar database (776a-776n), a particular set of intents/actions (778a-778n), and a particular personalized lexicon (786). Each gazetteer (784a-784n) may include domain-indexed lexical information associated with a particular user and/or device. For example, the Gazetteer A (784a) includes domain-index lexical information 786aa to 786an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 764 parses the query to determine an intent or intents for each identified domain, where the intent corresponds to the action to be performed that is responsive to the query. Each domain is associated with a database (778a-778n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 764 identifies potential intents for each identified domain by comparing words in the query to the words and phrases in the intents database 778. In some instances, the determination of an intent by the IC component 764 is performed using a set of rules or templates that are processed against the incoming text to identify a matching intent.

In order to generate a particular interpreted response, the NER 762 applies the grammar models and lexical information associated with the respective domain to actually recognize a mention of one or more entities in the text of the query. In this manner, the NER 762 identifies "slots" or values (i.e., particular words in query text) that may be needed for later command processing. Depending on the complexity of the NER 762, it may also label each slot with a type of varying levels of specificity (such as noun, place, device name, device location, city, artist name, song name, amount of time, timer number, or the like). Each grammar model 776 includes the names of entities (i.e., nouns) commonly found in speech about the particular domain (i.e., generic terms), whereas the lexical information 786 from the gazetteer 784 is personalized to the user(s) and/or the device. For instance, a grammar model associated with the shopping domain may include a database of words commonly used when people discuss shopping.

The intents identified by the IC component 764 are linked to domain-specific grammar frameworks (included in 776) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (776) framework or frameworks may correspond to sentence structures such as "purchase item called 'Item A' from Marketplace A."

For example, the NER component 762 may parse the query to identify words as subject, object, verb, preposition, etc., based on grammar rules and/or models, prior to recognizing named entities. The identified verb may be used by the IC component 764 to identify intent, which is then used by the NER component 762 to identify frameworks. A framework for the intent of "play a song," meanwhile, may specify a list of slots/fields applicable to play the identified "song" and any object modifier (e.g., specifying a music collection from which the song should be accessed) or the like. The NER component 762 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 762 may search the database of generic words associated with the domain (in the knowledge base 772). So, for instance, if the query was "identify this song," after failing to determine which song is currently being output, the NER component 762 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a skill 750. The destination skill 750 may be determined based on the NLU output. For example, if the NLU output includes a command to send a message, the destination skill 750 may be a message sending application, such as one located on the user device or in a message sending appliance, configured to execute a message sending command. If the NLU output includes a search request, the destination application 136 may include a search engine processor, such as one located on a search server, configured to execute a search command. After the appropriate command is generated based on the intent of the user, the skill 750 may provide some or all of this information to a text-to-speech (TTS) engine. The TTS engine may then generate an actual audio file for outputting the audio data determined by the skill 750 (e.g., "okay," or "playing notifications"). After generating the file (or "audio data"), the TTS engine may provide this data back to the remote system 116.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 136 during runtime operations where NLU operations are performed on text (such as text output from an ASR component 134). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 763. Each recognizer may include various NLU components such as an NER component 762, IC component 764 and other components such as an entity resolver, or other components.

For example, a messaging domain recognizer 763-A (Domain A) may have an NER component 762-A that identifies what slots (i.e., portions of input text) may correspond to particular words relevant to that domain. The words may correspond to entities such as (for the messaging domain) a recipient. An NER component 762 may use a machine learning model, such as a domain specific conditional random field (CRF) to both identify the portions corresponding to an entity as well as identify what type of entity corresponds to the text portion. The messaging domain recognizer 763-A may also have its own intent classification (IC) component 764-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 104 may include a model training component. The model training component may be used to train the classifier(s)/machine learning models discussed above. As noted above, multiple devices may be employed in a single speech-processing system. In such a multi-device system, each of the devices may include different components for performing different aspects of the speech processing. The multiple devices may include overlapping components. The components of the user device and the remote system 116, as illustrated herein are exemplary, and may be located in a stand-alone device or may be included, in whole or in part, as a component of a larger device or system, may be distributed across a network or multiple devices connected by a network, etc.

FIG. 8 illustrates a conceptual diagram of example components of an electronic device that may be utilized to output different portions of a content item as a user moves throughout a user environment. The device 106(1) may be implemented as a standalone device 106(1) that is relatively simple in terms of functional capabilities with limited input/output components, memory, and processing capabilities. For instance, the device 106(1) may not have a keyboard, keypad, or other form of mechanical input. The device 106(1) may also lack a display (other than simple lights, for instance) and a touch screen to facilitate visual presentation and user touch input. Instead, the device 106(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 106(1). Nonetheless, the primary, and potentially only mode, of user interaction with the device 106(1) is through voice input and audible output. In some instances, the device 106(1) may simply comprise a microphone 822, a power source, and functionality for sending generated audio data via one or more antennas 820 to another device.

The device 106(1) may also be implemented as a more sophisticated computing device, such as a computing device similar to, or the same as, a smart phone or personal digital assistant. The device 106(1) may include a display with a touch interface and various buttons for providing input as well as additional functionality such as the ability to send and receive communications. Alternative implementations of the device 106(1) may also include configurations as a personal computer. The personal computer may include a keyboard, a mouse, a display, and other hardware or functionality that is found on a desktop, notebook, netbook, or other personal computing devices. In examples, the device 106(1) may include an automobile, such as a car. In other examples, the device 106(1) may include a pin on a user's clothes or a phone on a user's person. In examples, the device 106(1) and may not include speaker(s) and may utilize speaker(s) of an external or peripheral device to output audio via the speaker(s) of the external/peripheral device. In this example, the device 106(1) might represent a set-top box (STB), and the device 106(1) may utilize speaker(s) of another device such as a television that is connected to the STB for output of audio via the external speakers. In other examples, the device 106(1) may not include the microphone(s) 822, and instead, the device 106(1) can utilize microphone(s) of an external or peripheral device to capture audio and/or generate audio data. In this example, the device 106(1) may utilize microphone(s) of a headset that is coupled (wired or wirelessly) to the device 106(1). These types of devices are provided by way of example and are not intended to be limiting, as the techniques described in this disclosure may be used in essentially any device that has an ability to recognize speech input or other types of natural language input.

The device 106(1) of FIG. 8 may include one or more controllers/processors 814, that may include a central processing unit (CPU) for processing data and computer-readable instructions, and memory 816 for storing data and instructions of the device 106(1). The device 106(1) may also be connected to removable or external non-volatile memory and/or storage, such as a removable memory card, memory key drive, networked storage, etc., through input/output device interfaces 812.

Computer instructions for operating the device 106(1) and its various components may be executed by the device's controller(s)/processor(s) 814, using the memory 816 as temporary "working" storage at runtime. A device's computer instructions may be stored in a non-transitory manner in non-volatile memory 816, storage 818, or an external device(s). Alternatively, some or all of the executable instructions may be embedded in hardware or firmware on the device 106(1) in addition to or instead of software.

The device 106(1) may include input/output device interfaces 812. A variety of components may be connected through the input/output device interfaces 812. Additionally, the device 106(1) may include an address/data bus 810 for conveying data among components of the respective device. Each component within a device 106(1) may also be directly connected to other components in addition to, or instead of, being connected to other components across the bus 810.

The device 106(1) may include a display 824, which may comprise a touch interface. Any suitable display technology, such as liquid crystal display (LCD), organic light emitting diode (OLED), electrophoretic, and so on, may be utilized for the displays 824. Furthermore, the processor(s) 814 may comprise graphics processors for driving animation and video output on the associated display, or the device 106(1) may be "headless" and may primarily rely on spoken commands for input. As a way of indicating to a user that a connection between another device has been opened, the device 106(1) may be configured with one or more visual indicators, such as the light elements(s) 826, which may be in the form of LED(s) or similar components (not illustrated), that may change color, flash, or otherwise provide visible light output, such as for a notification indicator on the device 106(1). The input/output device interfaces 812 that connect to a variety of components. This wired or a wireless audio and/or video port may allow for input/output of audio/video to/from the device 106(1). The device 106(1) may also include an audio capture component. The audio capture component may be, for example, a microphone 822 or array of microphones, a wired headset or a wireless headset, etc. The microphone 822 may be configured to capture audio. If an array of microphones is included, approximate distance to a sound's point of origin may be determined using acoustic localization based on time and amplitude differences between sounds captured by different microphones of the array. The device 106(1) (using microphone 822, wakeword detection component 701, ASR component 804, etc.) may be configured to generate audio data corresponding to captured audio. The device 106(1) (using input/output device interfaces 812, antenna 820, etc.) may also be configured to transmit the audio data to the remote system 116 for further processing or to process the data using internal components such as a wakeword detection component 701.

Via the antenna(s) 820, the input/output device interface 812 may connect to one or more networks 118 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 106(1) via wired connection to an external alternating current (AC) outlet, and/or via onboard power sources, such as batteries, solar panels, etc.

Through the network(s) 118, the speech-processing system may be distributed across a networked environment. Accordingly, the device 106(1) and/or the remote system 116 may include an ASR component. The ASR component 804 of device 106(1) may be of limited or extended capabilities. The ASR component 804 may include language models stored in ASR model storage component, and an ASR component 804 that performs automatic speech recognition. If limited speech recognition is included, the ASR component 804 may be configured to identify a limited number of words, such as keywords detected by the device, whereas extended speech recognition may be configured to recognize a much larger range of words.

The device 106(1) and/or the remote system 116 may include a limited or extended NLU component. The NLU component 806 of device 106(1) may be of limited or extended capabilities. The NLU component 806 may comprise a name entity recognition module, an intent classification module and/or other components. The NLU component 806 may also include a stored knowledge base and/or entity library, or those storages may be separately located.

In examples, AED 802 may also be performed by the device 106(1). In these examples, the operations may include causing the AED component 802 to be enabled or otherwise turned on, or the operations may include causing the AED component 802 to transition from a first mode to a second mode representing a higher sensitivity to audio data generated by the microphone 822. The AED component 802 may utilize the audio data generated by the microphone 822 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 802 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 802 may determine that the audio fingerprint corresponds to at least one of the reference audio fingerprints, such as to a given confidence level, and may generate confirmatory data indicating that the audio fingerprint corresponds to the at least one reference audio fingerprint.

The device 106(1) and/or the remote system 116 may also include skill 808 that is configured to execute commands/functions associated with a spoken command as described herein. The device 106(1) may include a wake word engine, which may be a separate component or may be included in an ASR component 804. The wakeword detection component 701 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 106(1) may be configured collectively to identify a set of the directional audio signals in which the wake expression is detected or in which the wake expression is likely to have occurred. In examples, the device 106(1) and may not include speaker(s) 118 and may utilize speaker(s) of an external or peripheral device to output audio via the speaker(s) of the external/peripheral device.

In some implementations, the processors(s) described herein may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) described herein may possess its own local memory, which also may store program modules, program data, and/or one or more operating systems. The processors(s) described herein may be located in a single device or system, or across disparate devices or systems, which may be owned or operated by various entities.

The memory described herein may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory described herein may be implemented as computer-readable storage media ("CRSM"), which may be any available physical media accessible by the processor(s) described herein to execute instructions stored on the memory described herein. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) described herein.

The processes described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving input audio data from a first electronic device located in a first room of an environment, the input audio data representing a voice command of a user requesting output of a content item;
    analyzing the input audio data to identify the voice command requesting output of the content item;
    sending, to the first electronic device, first output audio data of the content item for output by the first electronic device;
    receiving data from a second electronic device located in a second room of the environment;
    determining, based at least in part on the receiving of the data, that the user has moved from the first room of the environment to the second room of the environment;
    at least partly in response to the determining that the user has moved from the first room of the environment to the second room of the environment:
        sending, to the first electronic device, a first instruction to cease output of the first output audio data; and
        sending, to the second electronic device, second output audio data of the content item for output by the second electronic device, the second output audio data being different than the first output audio data;

determining that the user has moved from the second room in the environment to a third room in the environment, the third room including a third electronic device; and sending, to the third electronic device and at least partly in response to the determining that the user has moved from the second room of the environment to the third room of the environment, a second instruction to at least one of turn on the third electronic device, turn off the third electronic device, lock a door coupled to the third electronic device, unlock the door coupled to the third electronic device, or change a temperature setting associated with the third electronic device.

2. The method as recited in claim 1, wherein:

the sending the first output audio data comprises sending first output audio data comprising first speech spoken by a first character associated with the content item; and the sending the second output audio data comprises sending second output audio data comprising second speech spoken by a second character associated with the content item.

3. The method as recited in claim 1, further comprising:

determining that the user has moved from the third room in the environment to a fourth room in the environment, the fourth room including a fourth electronic device; and sending, to the fourth electronic device and at least partly in response to the determining that the user has moved from the third room of the environment to the fourth room of the environment, image data of the content item for output on a display of the fourth electronic device.

4. The method as recited in claim 1, further comprising:

receiving image data from an imaging device associated with the environment;

analyzing the image data to identify an identifier of a user that has entered the environment; and sending third output audio data for output on at least one of the first electronic device or the second electronic device, the third output audio data indicating the identifier of the user that entered the environment.

5. The method as recited in claim 1, further comprising:

determining a capability of the first electronic device; and selecting the first output audio data of the content item for output by the first electronic device based at least in part on the capability of the first electronic device.

6. A system comprising:

one or more processors; and one or more computer-readable media storing computer-executable instructions that, when executed, cause the one or more processors to perform acts comprising:

receiving a request to output a content item in an environment;

accessing a user account associated with the request;

determining, via the user account, that a first electronic device is associated with a first location in the environment;

determining, via the user account, that a second electronic device is associated with a second location in the environment;

sending first audio content of the content item for output by the first electronic device, the first audio content spoken by a first character of the content item;

determining that a user has moved to the second location in the environment; and sending second audio content of the content item for output by the second electronic device, the second audio content differing from the first audio content and the second content spoken by a second character of the content item, the first character differing from the second character.

7. The system as recited in claim 6, wherein:

the first audio content is associated with a first geographical location associated with the content item; and the second audio content is associated with a second geographical location associated with the content item, the second geographical location differing from the first geographical location.

8. The system as recited in claim 6, wherein the one or more computer-readable media further store computer-executable instructions that, when executed, cause the one or more processors to perform acts comprising:

determining a setting related to temperature specified by the content item; and sending, to a third electronic device, an instruction to execute the setting related to the temperature as specified by the content item.

9. The system as recited in claim 6, wherein the one or more computer-readable media further store computer-executable instructions that, when executed, cause the one or more processors to perform acts comprising:

determining a lighting setting specified by the content item; and sending, to a lighting device, an instruction to execute the lighting setting specified by the content item.

10. The system as recited in claim 6, wherein the one or more computer-readable media further store computer-executable instructions that, when executed, cause the one or more processors to perform acts comprising:

determining a lock setting specified by the content item; and sending, to a locking device, an instruction to execute the lock setting specified by the content item.

11. The system as recited in claim 6, wherein the one or more computer-readable media further store computer-executable instructions that, when executed, cause the one or more processors to perform acts comprising:

receiving image data from an imaging device associated with the environment;

analyzing the image data to identify an identifier of a user that has entered the environment; and sending output audio data for output on at least one of the first electronic device or the second electronic device, the output audio data indicating the identifier of the user.

12. The system as recited in claim 6, wherein the one or more computer-readable media further store computer-executable instructions that, when executed, cause the one or more processors to perform acts comprising:

determining a capability of the second electronic device; and selecting the second audio content of the content item for output by the second electronic device based at least in part on the capability of the second electronic device.

13. The system as recited in claim 6, wherein the one or more computer-readable media further store computer-executable instructions that, when executed, cause the one or more processors to perform an act comprising sending an instruction to the first electronic device to cease output of the first audio content at least partly in response to the determining that the user has moved to the second location in the environment.

14. A method comprising:
receiving a request to output a content item in an environment;
accessing a user account associated with the request;
determining, via the user account, that a first electronic device is associated with a first location in the environment;
determining, via the user account, that a second electronic device is associated with a second location in the environment;
sending first content of the content item for output by the first electronic device;
determining that a user has moved to the second location in the environment;
sending second content of the content item for output by the second electronic device, the second content differing from the first content;
determining at least one of a temperature setting, a lighting setting, or a lock setting specified by the content item; and
sending, to a third electronic device, an instruction to execute the at least one of the temperature setting, the lighting setting, or the lock setting.

15. The method as recited in claim 14, wherein:
the sending the first content comprises sending first audio content spoken by a first character of the content item; and
the sending the second content comprises sending second audio content spoken by a second character of the content item, the first character differing from the second character.

16. The method as recited in claim 14, wherein:
the sending the first content comprises sending first audio content associated with a first geographical location associated with the content item; and
the sending the second content comprises sending second audio content associated with a second geographical location associated with the content item, the second geographical location differing from the first geographical location.

17. The method as recited in claim 14, wherein:
the determining the at least one of the temperature setting, the lighting setting, or the lock setting comprises determining the temperature setting; and
the sending the instruction comprises sending, to the third electronic device, an instruction to execute the temperature setting.

18. The method as recited in claim 14, wherein:
the determining the at least one of the temperature setting, the lighting setting, or the lock setting comprises determining the lighting setting; and
the sending the instruction comprises sending, to the third electronic device, an instruction to execute the lighting setting.

19. The method as recited in claim 14, wherein:
the determining the at least one of the temperature setting, the lighting setting, or the lock setting comprises determining the lock setting; and
the sending the instruction comprises sending, to the third electronic device, an instruction to execute the lock setting.

20. The method as recited in claim 14, further comprising:
receiving image data from an imaging device associated with the environment;
analyzing the image data to identify an identifier of a user that has entered the environment; and
sending output audio data for output on at least one of the first electronic device or the second electronic device, the output audio data indicating the identifier of the user.

* * * * *